(12) United States Patent
Hashimoto

(10) Patent No.: US 6,223,286 B1
(45) Date of Patent: *Apr. 24, 2001

(54) MULTICAST MESSAGE TRANSMISSION DEVICE AND MESSAGE RECEIVING PROTOCOL DEVICE FOR REALIZING FAIR MESSAGE DELIVERY TIME FOR MULTICAST MESSAGE

(75) Inventor: Mikio Hashimoto, Chiba (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/820,652

(22) Filed: Mar. 18, 1997

(30) Foreign Application Priority Data

Mar. 18, 1996 (JP) ..................................................... 8-061351

(51) Int. Cl.⁷ ......................................................... H04L 9/00
(52) U.S. Cl. ........................... 713/178; 713/168; 713/169; 380/287; 380/280; 455/18; 455/412; 455/502
(58) Field of Search ................................... 380/21, 9, 49, 380/48, 287, 280; 455/18, 412, 502; 713/168, 169, 178, 400

(56) References Cited

U.S. PATENT DOCUMENTS

| 5,109,384 | 4/1992 | Tseung ................................. 371/32 |
| 5,297,143 | 3/1994 | Marek et al. .......................... 371/32 |

OTHER PUBLICATIONS

Armstrong et al., "Multicast Transport Protocol", pp. 1–38, (1992).

*Primary Examiner*—Tod R. Swann
*Assistant Examiner*—Paul E. Callahan
(74) *Attorney, Agent, or Firm*—Foley & Lardner

(57) ABSTRACT

A multicast message transmission device and a message receiving protocol device for guaranteeing a fair message delivery time for a multicast message. At the receiving protocol device, a release time of the received multicast message is set to a prescribed time specified to all receiving protocol devices of the same multicast group, and the received multicast message is stored until the release time, and then released to a corresponding upper level device. At the transmission device, each receiving protocol device is authenticated, and then the encrypted multicast messages are transmitted to the receiving protocol devices, while a prescribed decryption key corresponding to the encryption key of the encrypted multicast message is distributed the authenticated receiving protocol devices prior to transmissions of the multicast messages.

26 Claims, 28 Drawing Sheets

FIG.19

|  | MESSAGE DELIVERY WITH ACKNOWLEDGE (2 PHASE) | MESSAGE DELIVERY WITHOUT ACKNOWLEDGE (1 PHASE) |
|---|---|---|
| WITH RELEASE TIME ACKNOWLEDGE RESPONSE | 2m+2 (1ST EMBODIMENT) | 2m |
| WITH RELEASE RESULT ACKNOWLEDGE | 2m+k+2 (3RD EMBODIMENT) | km+2 |
| WITHOUT RELEASE RESULT ACKNOWLEDGE | 2m+k | km (2ND EMBODIMENT) |

FIG.20

| | |
|---|---|
| MESSAGE LOSS RATE BETWEEN DEVICES i&j (PARAMETER $\tau_d$) | $P(t_{ij} > \tau_d)$ |
| MULTICAST GROUP MESSAGE LOSS RATE (PARAMETER $\tau_d$) | $P_{loss}(\tau_d) = \max\{P_{loss}(t_{ij} > \tau_d)\}$ |
| RESPONSE TIME BETWEEN DEVICES i&j | $RTT_{ij} = t_{ij} + T_P + t_{ji}$ |
| TIME-OUT TIME $T_s$ BETWEEN DEVICES i&j (PARAMETER $P_{tout}$) | $P_{tout} > P(RTT_{ij} > T_s)$ |
| PACKET TRANSMISSION INTERVAL $\tau_i$ (PARAMETER $P_{loss}$) | $P_{Burst}(\tau_i) \ll P_{loss}$ |
| RELEASE PROCESSING TIME | $\tau_{dec}$ |

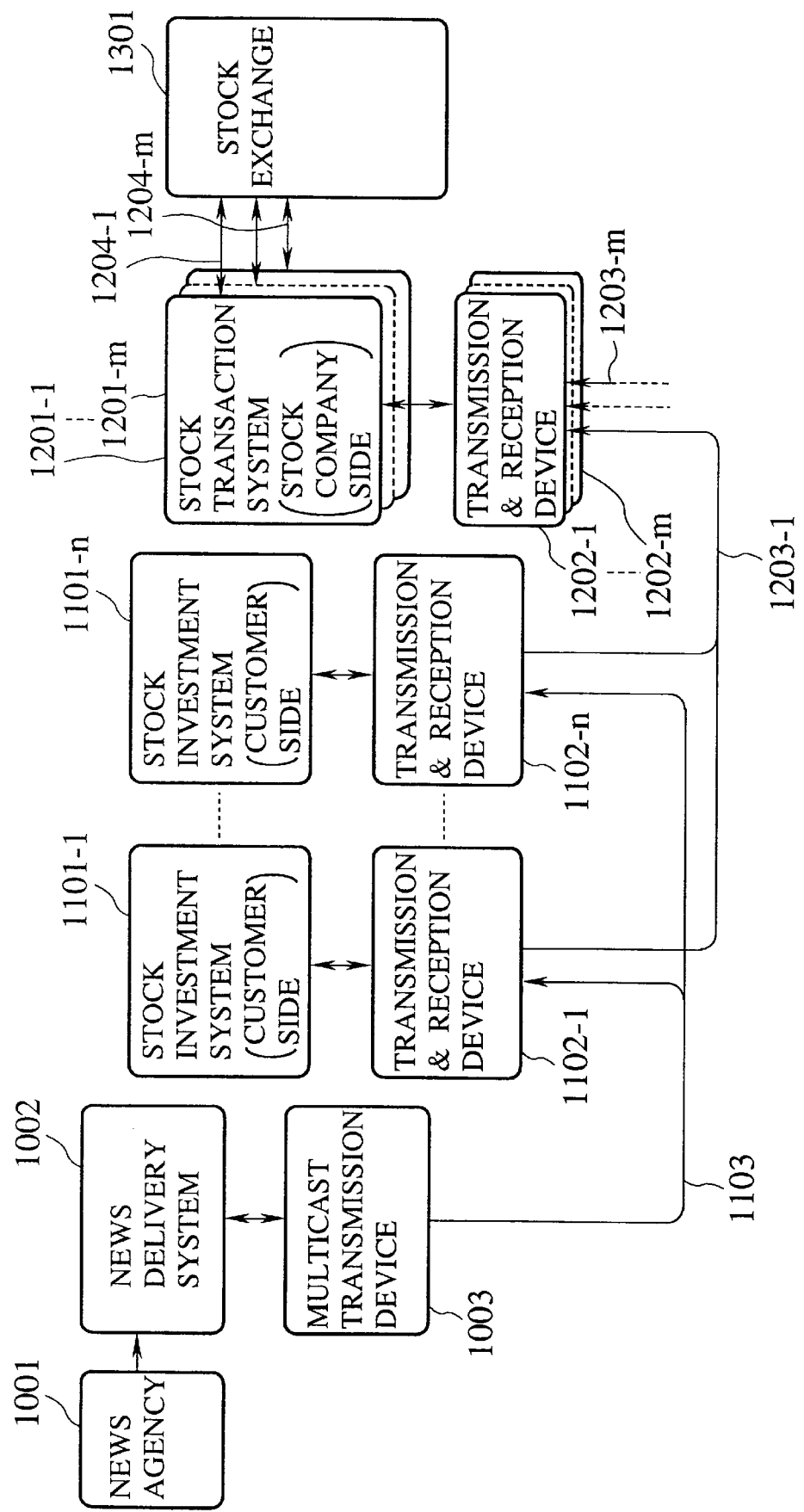

MULTICAST MESSAGE TRANSMISSION DEVICE AND MESSAGE RECEIVING PROTOCOL DEVICE FOR REALIZING FAIR MESSAGE DELIVERY TIME FOR MULTICAST MESSAGE

BACKGROUND OF THE INVENTION

1. Field of the Invention

The present invention relates to a multicast message transmission device and a message receiving protocol device, which realize a fair message delivery time for a multicast message transmitted from a multicast message transmission device to a plurality of message receiving protocol devices through a communication network.

2. Description of the Background Art

A multicast communication is a communication scheme useful for applications such as a broadcasting and a distributed information processing using a communication network.

In the computer application and the information providing service, a highly reliable multicast communication scheme is required. Also, in order to take a full advantage of the characteristics of the multicast communication, there are cases in which the multicast communication is required to have a property that the identical result can be obtained at all receiver devices. This property is also applicable to a scheme for maintaining the integrity of data in a case of distributedly storing data, and a scheme for realizing a fair information providing service among subscribers.

In response to these demands, a protocol for guaranteeing the following properties has been proposed and practiced. Here, the group of receiver devices which receive the same multicast message are collectively referred to as a multicast group.

(1) Atomicity:

In a case of delivering a certain message, this message is not delivered at all unless this message is received by all the receiver devices. In other words, when a multicast message is received at one receiver device, it is guaranteed that the same multicast message is also delivered to all the other receiver device of the same multicast group.

(2) Order equivalency:

An order of receiving messages is identical among all the receiver devices of the same multicast group. The major causes for lowering the reliability in the multicast communication are a bit error in the message transmission and a discarding of the message during the message transmission. The bit error is caused by an error in a transmission path, while the discarding is caused by the congestion (the congestion in the packet network or the ATM network). As for the bit error, the message delivery failure probability can be lowered by employing the error correction technique at communicating terminals. As for the discarding, the message delivery failure probability can be lowered by carrying out the message re-transmission. Of course, the re-transmission is also effective for the message delivery failure due to the bit error, but the error correction technique is not effective for the congestion over such an extended period of time as the message is completely lost. In order to secure the reliability with respect to the congestion, the re-transmission technique is indispensable.

On the other hand, for a realization of the property that the identical receiving result can be obtained at all the receiver devices, the message delivery failure and the irregularity of the transmission delay can be obstacles. The message delivery failure can be recovered by the re-transmission as described above, but the message delivery time will be delayed when the re-transmission is carried out. Also, the transmission delay difference affects the message delivery time.

In the following, the prior art for realizing the multicast communication which satisfies the above described two properties will be described.

A device for managing the message transmission and reception in the multicast group is called a master, and a device for receiving a message is called a client, while a device for transmitting a message is called a sender. Each of the master, the client, and the sender can be conceptually divided into a functional portion for processing the multicast communication protocol and a functional portion for carrying out the multicast communication application by utilizing the protocol processing function.

Here, an exemplary case for providing the stock price information by the multicast will be considered. The application in this case corresponds to a portion for carrying out the broadcast of the stock price at the sender side, and a portion for processing the stock price information at the receiver side, such as a portion for handling the electronic stock transaction according to the stock price information for example.

The protocol processing function and the application function can be divided conceptually, but in general, they are not clearly separated in the actual implementation. In many personal computers, even when the protocol processing function and the application function are divided as the software function portions, both of these functions are executed on the same memory space by the same processor.

Now, with reference to FIG. 1, a conventional multicast receiving procedure will be described.

A master 701 transmits a message to a client-A 702 and a client-B 703 through a multicast connection. The messages are assigned with identifiers which have continuously ordered relationship. In FIG. 1, Mp denotes a message with an identifier p.

When the message Mp is received, the client-A 702 and the client-B 703 transmit acknowledge response ACKp(A) and ACKp(B) respectively to the master 701. The acknowledge response contains the message identifier p and the client identifier. There is no need to multicast this response. When the acknowledge responses ACKp(X) from all the clients (the client-A 702 and the client-B 703 in this case) are confirmed, the master 701 multicasts a message release permission RELp(i). Here, i is an identifier of a message to which the release permission is issued. This identifier is given in an order of issuing the release permission, in a manner of i, i+1, . . . .

Next, with reference to FIG. 2, a conventional multicast receiving procedure in a case of a message loss will be described. Here, the same notations as in FIG. 1 are used in FIG. 2.

The master 701 transmits the message Mp to the client-A 702 and the client-B 703 through the multicast connection. The master 701 also sets a timer T1 at a time of the transmission. The client-A 702 receives the message Mp at a time t0. On the other hand, the message to the client-B 703 is lost. In this case, the master 701 detects that the acknowledge response for the message Mp from the client-B 703 has not arrived at the time-out timing of the timer T1, and carries out the re-transmission of the message Mp. When the message Mp is received, the client-B 703 transmits the acknowledge response ACKp(B). When this acknowledge response ACKp(B) is received, the master 701 has the acknowledge responses from all the clients, so that the master 701 multicasts the message release permission RELp(i).

In the message re-transmission, the message is multicast to all the clients, and the client who received this message transmits the acknowledge response, even when the acknowledge response for the same message was already transmitted before. In this manner, even when the acknowledge response ACKp(X) is lost, the master 701 can confirm that the message is received by all the clients according to the acknowledge responses for the re-transmission after the time-out.

Next, with reference to FIG. 3, a conventional multicast receiving procedure in a case of a release permission message loss will be described. Here, the same notations as in FIG. 1 are used in FIG. 3.

FIG. 3 shows a case in which the release permission message RELp(i) for the message Mp transmitted to the client-B 703 is lost. The client-A 702 normally received the release permission message RELp(i), and the message Mp is released at a time t2.

At the client-B 703, the receiving procedure for the next message Mp+1 is normally carried out while the message Mp remains unreleased, and the client-B 703 receives the release permission message RELp+1 for that next message Mp+1. Then, the client-B 703 compares the identifier p+1 of this release permission message with the identifier p−1 of the immediately previously received release permission message, and detects the discontinuity. When the discontinuity is detected, the client-B 703 judges that the release permission message has been lost, and releases the corresponding message. In this case, the message Mp corresponding to the identifier p between p−1 and p+1 is released.

The message is released upon detecting the discontinuity of the release permission message identifiers, so that the message Mp is released before the message Mp+1, and the receiving order is maintained Next, with reference to FIG. 4, a conventional procedure in a case of a message delivery failure will be described. Here, the same notations as in FIG. 1 are used in FIG. 4.

The master 701 transmits the message Mp to the client-A 702 and the client-B 703 through the multicast connection. The master 701 also sets the timer T1 at a time of the transmission. The client-A 702 receives the message Mp at a time t0. On the other hand, the message to the client-B 703 is lost. In this case, the master 701 detects that the acknowledge response for the message Mp from the client-B 703 has not arrived at the time-out timing of the timer T1, and carries out the re-transmission of the message Mp. When the receiving acknowledge response from the client-B 703 cannot be obtained even after this procedure is repeated for a prescribed number of times, it is regarded as the message delivery failure, and the master multicasts a transmission failure message FAILp. When this transmission failure message FAILp is received, the client-A 702 cancels the delivery of the message Mp.

Now, the conventional protocol described above has been associated with the following two problems.

(1) Unfairness due to transmission delay:

In FIG. 2, between the time t3 at which the client-A 702 receives the release permission and the time t2 at which the client-B 703 receives the release permission, there is a time difference td due to the transmission delay difference. Due to this difference, the message will be unfairly given to the respective applications at different timings.

(2) Forestalling of a message:

It is possible for the client-A 702 to read the message Mp at the time t0 immediately after receiving this message Mp. Of course, this is a violation of the protocol agreement, but whether such a violation has been committed or not cannot be checked from the other network device unless the protocol implementation is checked.

Also, even when the protocol implementation of the client device is proper, if there is a device on the network or a function within the client device which is wiretapping the message, it is possible to read the message before any other client devices can read the message. In a case of the personal computer described above, the wiretapping is possible when the application function reads out the work memory of the protocol processing, and when the receiver device is provided as a user side device, it is rather easy to add such a modification to the receiver device.

Next, with reference to FIG. 5, the prior art for realizing the identical message receiving order among all the clients in the multicast network having a plurality of senders will be described. Here, the multicast group includes a master 801, a client-A 802, a client-B 803, a sender-a 804, and a sender-b 805.

The sender-a 804 multicasts the message $Mp^a$ at a time t0. Here $Mp^B$ denotes a message having an identifier p which is transmitted from the sender-a 804, and p is a unique identifier for the sender-a 804. When this message $Mp^a$ is received, the client-A 802 and the client-B 803 transmit respective acknowledge responses $ACKp^a$ (A) and $ACKp^a$ (B) to the sender-a 804. When ACKs from all the clients are received, the sender-a 804 transmits a message release permission request $RELREQp^a$ to the master 801.

When this message release permission request $RELREQp^a$ is received, the master 801 multicasts a message release permission $RELp^a$ (i). When this message release permission $RElp^a$ (i) is received, each client releases the message.

Now, a procedure for transmitting messages of a plurality of senders is as follows.

The sender-a 804 multicasts the message $Mp+1^a$ at a time t1. Then, the sender-b 805 multicasts the message $Mq^b$ at a time t2. When these messages are received, the client-A 802 and the client-B 803 transmit respective acknowledge responses $ACKp+1^a$ (A), $ACKq^b$ (A), $ACKp+1^a$ (B) and $ACKq^b$ (B) to the sender-a 804 and the sender-b 805 respectively, and when ACKs from all the clients are received, the sender-a 804 and the sender-b 805 transmit respective message release permission requests $RELREQp+1^a$ and $RELREQq^b$ to the master 801.

Here, the message receiving order at the client-A 802 and the client-B 803 is not necessarily identical to the transmission order, because of the reasons such as the transmission delay and the delay jitter.

For each message to which the message release permission request is received, the master 801 multicasts a message release permission, in an order of receiving the message release permission requests. HEre, the message release permissions are assigned with unique identifiers i, i+1, for the multicast group. For this reason, when the client-A 802 or the client-B 803 fails to receive the message release permission, or when the receiving order is reversed, each client can detect such a receiving failure or the reversed receiving order, so that the message release order judged by the master 801 can be maintained at all the clients.

Here, the message from the sender-b 805 arrived first at the client-A 802, while the message from the sender-a 804 arrived first at the client-B 803. The sender-a 804 have to wait until the acknowledge responses from all the clients are received, so that the transmission of the message release permission request from the sender-a 804 will be later than that by the sender-b 805.

The master 801 issues the message release permissions in an order of receiving the message release permission requests, so that the message for which the message release permission request arrived at the master 801 last will be released last.

Now, the message transmitted by the sender-a 804 at the time t1 is arriving at the master 801 and the client-B 803 earlier than the message transmitted by the sender-b 805 at the later time t2. However, the message transmitted by the sender-b 805 is arriving earlier than the message transmitted by the sender-a 804 at the client-A 802. After all, the the release of the message transmitted earlier by the sender-a 804 will be later than the release of the message transmitted later by the sender-b 805 because ACKs for the message transmitted by the sender-a 804 arrive at the master 801 later.

In addition, when there is an improper implementation of the protocol, it is also possible to delay the message release time by purposefully not returning the acknowledge response for that message. Also, when the sender and the client are integrally provided, it is possible to alter the receiving order for the other clients such that as if the own message was transmitted earlier than the message sent by the other sender, by transmitting the own message only after the message from the other sender is received, and then transmitting ACK for that received message after the own message is transmitted.

As such, in the multicast protocol for a case of using a plurality of senders, the order relationship among the received messages can be maintained identically among all the clients, but the message transmission time relationship at the transmitting side is not necessarily maintained identically among different senders.

In particular, when a communication network having the transmission delay jitter is utilized, it is difficult to correct the influence due to the transmission delay jitter. Also, when the re-transmission is required, the effect similar to a case where the arrival of the message is delayed will be caused.

The multicast protocol for a case of using a plurality of senders has an unfairness due to the message delivery delay which is probabilistically caused by the transmission delay difference and the re-transmission, and it is impossible in principle to resolve this problem on the protocol based on the message identifiers. As a solution to this problem, there is a method for attaching the transmission time to the message at the sender side and determining the message receiving order at the receiver side by evaluating the attached transmission time of the message, as disclosed in Birman K., Schiper, A., Stephenson, P.: "Lightweight Causal and Atomic Group Multicast", ACM Trans. Computer Systems, 9(3), 1991.

However, in this method, it is impossible to prevent the sender from falsifying the transmission time in order to manipulate the message order.

As described, even though the atomicity and the order equivalency can be guaranteed by the multicast protocol, the conventional multicast protocol has not been fair when a time by which the application actually reads the message is accounted and a possibility for the improper protocol processing is taken into consideration. This unfairness can be an obstacle in a case of using the multicast communication for the electronic commercial transactions or for the delivery of news that can affect the transactions.

In summary, the prior art is associated with the problem of the unfairness regarding the message release time. Namely, there can be the unfairness regarding a time by which the message becomes utilizable because of the transmission delay differences.

Secondly, there is a possibility of the protocol implementation violation in the prior art. Namely, by pretending the message receiving failure, it is possible to delay the message receiving by the other receiver terminals. In addition, it is possible to deceive the other clients such that even when the own message is transmitted after the received message is read, the message order can be made to appear as reversed for the other clients.

Thirdly, there is a problem of the message wiretapping in the prior art. Namely, there is possibility for the application to read the message while the other receivers are not in a state capable of receiving the message (a receiving acknowledged state)

SUMMARY OF THE INVENTION

It is therefore an object of the present invention to provide a multicast message transmission device and a message receiving protocol device capable of guaranteeing a fair message delivery time for a multicast message.

It is another object of the present invention to provide a multicast message transmission device and a message receiving protocol device capable of realizing the identical multicast message receiving time regardless of the probabilistic message delivery delay due to the transmission delay difference and the re-transmission.

It is another object of the present invention to provide a multicast message transmission device and a message receiving protocol device in which the message transmission time from a user's viewpoint can be correctly reflected in the receiving order at the other receiving devices.

According to one aspect of the present invention there is provided a receiving protocol device in a multicast communication system in which multicast messages are transmitted from at least one multicast transmission device to a plurality of receiving protocol devices belonging to an identical multicast group, the receiving protocol device comprising: a lower level interface unit for receiving each multicast message transmitted from the multicast transmission device; a release time setting unit for setting a release time of the multicast message received by the lower level interface unit to a prescribed time specified to all of said plurality of receiving protocol devices; a message storing unit for storing the multicast message received by the lower level interface unit until the release time set by the release time setting unit; and an upper level interface unit for releasing the message stored by the message storing unit to an upper level device provided in correspondence to said receiving protocol device.

According to another aspect of the present invention there is provided a multicast transmission device in a multicast communication system in which multicast messages are transmitted from at least one multicast transmission device to a plurality of receiving protocol devices belonging to an identical multicast group, the multicast transmission device comprising: an authentication unit for authenticating each receiving protocol device; a transmission unit for transmitting the multicast messages encrypted by using an encryption key to the receiving protocol devices; and a key distribution unit for distributing a prescribed decryption key corresponding to the encryption key to those receiving protocol devices which are authenticated by the authentication unit, prior to transmissions of the multicast messages by the transmission unit.

According to another aspect of the present invention there is provided a multicast communication device in a multicast communication system in which multicast messages are transmitted from at least one multicast transmission device to a plurality of receiving protocol devices belonging to an identical multicast group, the multicast communication device comprising: a receiving protocol device section functioning as one receiving protocol device, including: a lower level interface unit for receiving each multicast message transmitted from the multicast transmission device; a release time setting unit for setting a release time of the multicast message received by the lower level interface unit to a prescribed time specified to all of said plurality of receiving protocol devices; a message storing unit for storing the multicast message received by the lower level interface unit until the release time set by the release time setting unit; and an upper level interface unit for releasing the message stored by the message storing unit to an upper level device in correspondence to said multicast communication device; and a multicast transmission device section, including: an authentication unit for authenticating each receiving protocol device; a transmission unit for transmitting the multicast messages encrypted by using an encryption key to the receiving protocol devices; and a key distribution unit for distributing a prescribed decryption key corresponding to the encryption key to those receiving protocol devices which are authenticated by the authentication unit, prior to transmissions of the multicast messages by the transmission unit.

According to another aspect of the present invention there is provided a method for transmitting a multicast message at a multicast transmission device in a multicast communication system in which multicast messages are transmitted from at least one multicast transmission device to a plurality of receiving protocol devices belonging to an identical multicast group, the method comprising the steps of: transmitting a multicast message to said plurality of receiving protocol devices; determining a release time of the multicast message transmitted by the transmitting step; and notifying the release time determined by the determining step to all of said plurality of receiving protocol devices, so that the multicast message transmitted by the transmitting step is released by all of said plurality of receiving protocol devices at the release time as notified.

According to another aspect of the present invention there is provided a method for receiving a multicast message at a receiving protocol device in a multicast communication system in which multicast messages are transmitted from at least one multicast transmission device to a plurality of receiving protocol devices belonging to an identical multicast group, the method comprising the steps of: receiving a multicast message transmitted from the multicast transmission device; storing a release time of the multicast message received by the receiving step as notified from the multicast transmission device, in correspondence to the multicast message received by the receiving step; and releasing the multicast message stored by the storing step at the release time stored by the storing step, to an upper level device provided in correspondence to said receiving protocol device, so that the multicast message transmitted from the multicast transmission device is released by all of said plurality of receiving protocol devices at the release time as notified.

Other features and advantages of the present invention will become apparent from the following description taken in conjunction with the accompanying drawings.

BRIEF DESCRIPTION OF THE DRAWINGS

FIG. 19 is a table summarizing various combinations of a message delivery schemes and release time delivery schemes used in the present invention.

FIG. 20 is a table summarizing various parameters used in the description of the present invention.

FIG. 28 is a block diagram of a system combining a news delivery and an automatic stock transaction in the fourth embodiment of the present invention.

DETAILED DESCRIPTION OF THE PREFERRED EMBODIMENTS

First, the outline of the multicast message transmission device and the message receiving protocol device according to the present invention will be briefly described.

As a solution to the problem regarding the message release time, the fair message transfer within a range of an error in a terminal time synchronization through a network can be realized by synchronizing the absolute time of the clients and using the identical message transfer time for all the clients, however, the problem of the protocol implementation violation cannot be resolved by the multicast protocol by itself. For instance, it is impossible to prevent the attaching of an old timestamp to the transmission message as long as there is a possibility of the message loss.

Also, even if the protocol processing is totally proper, there remains the problem of the message wiretapping since it is possible to forestall the message that is still not in the received state on the protocol, by directly reading a memory for storing the message. This problem can be resolved by using the encryption which makes it impossible to acquire the message unless the proper protocol processing is carried out, and the protection against the improper reading of the internal information of the decryption device.

In view of these facts, the present invention incorporates the following three major features. First, a timer which is synchronized within the multicast group is provided at a protocol device, and an agreement as to a time for giving a message to the application is made within the multicast group. Second, a procedure for judging whether the protocol device is authenticated by the reliable organization or not is incorporated into the multicast protocol and the protocol device which implements the multicast protocol. Third, the multicast message is encrypted, while the protocol device is made to store the decrypted message and output the message only at the agreed time. In this manner, all the problems mentioned above can be resolved, and the desirable fair protocol processing can be realized.

Next, with reference to FIG. 6 to FIG. 21, the first embodiment of the multicast message transmission device and the message receiving protocol device according to the present invention will be described in detail.

Figure 6:
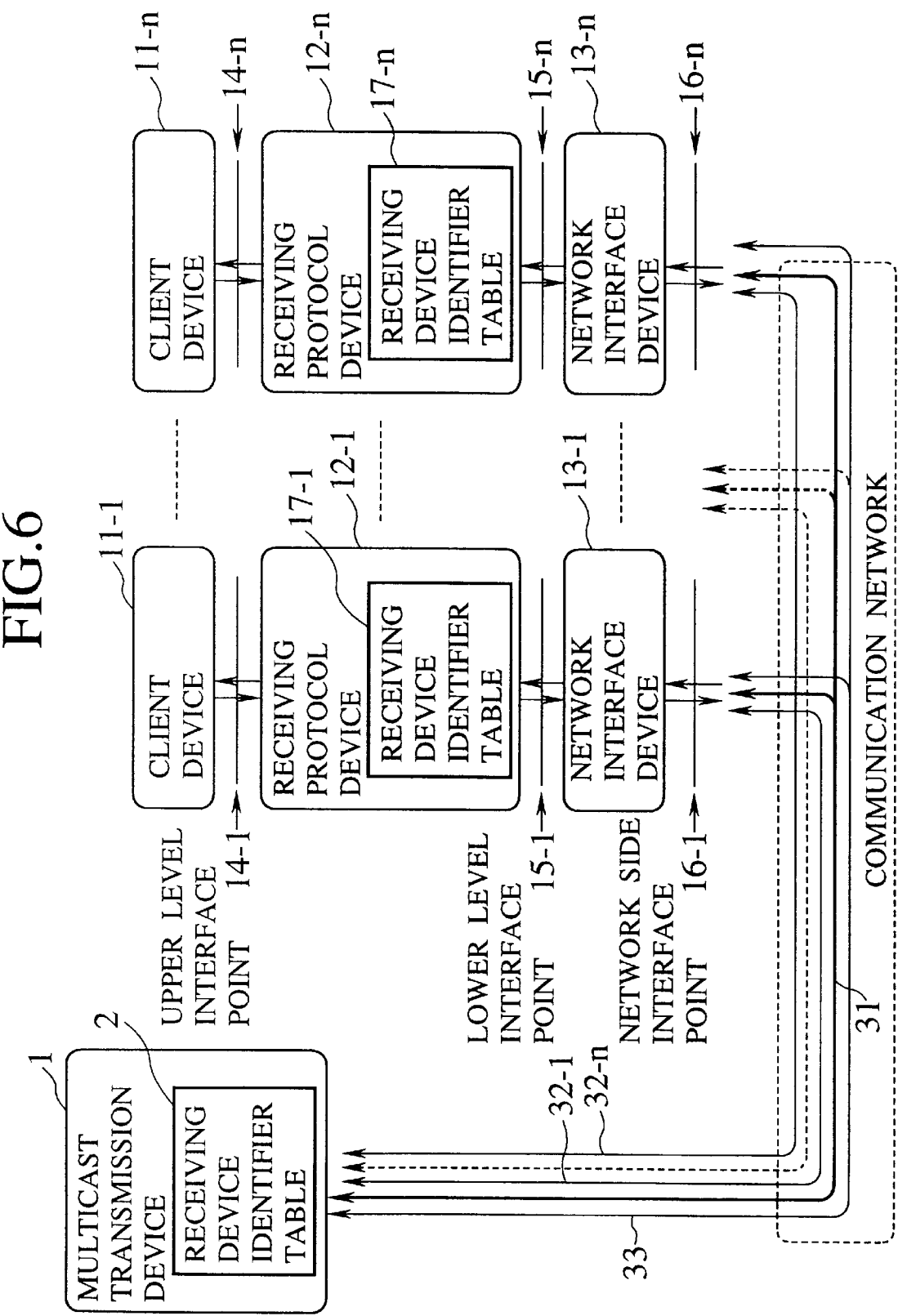
FIG. 6 is a block diagram showing a basic configuration of a multicast communication system in the first embodiment of the present invention.

FIG. 6 shows a basic configuration of a multicast communication system in this first embodiment. This multicast communication system of FIG. 8 comprises: a multicast transmission device 1; multicast receiving client devices (client devices) 11-1 to 11-n; multicast receiving protocol devices (receiving protocol devices) 12-1 to 12-n provided in correspondence to the client devices 11-1 to 11n; network side interface devices (network interface devices) 13-1 to 13-n provided in correspondence to the receiving protocol devices 12-1 to 12-n; and a communication network 31 connecting the multicast transmission device 1 and the client devices 11-1 to 11-n through the receiving protocol devices 12-1 to 12-n and the network interface devices 13-1 to 13-n.

The multicast transmission device 1 has a receiving device identifier table 2, while the receiving protocol devices 12-1 to 12-n have respective receiving device identifier tables 17-1 to 17-n.

The client devices 11-1 to 11-n are connected with the respective receiving protocol devices 12-1 to 12-n at upper level interface points 14-1 to 14-n, the receiving protocol devices 12-1 to 12-n are connected with the respective network interface devices 13-1 to 13-n at lower level interface points 15-1 to 15-n, and the network interface devices 13-1 to 13-n are connected with the communication network at network side interface points 16-1 to 16-n.

The communication network 31 includes point-to-point connections 32-1 to 32-n which are set up respectively between the multicast transmission device 1 and the client devices 11-1 to 11-n, and a multicast connection 33 which is set up between the multicast transmission device 1 and the client devices 11-1 to 11-n.

Each of the network interface devices 13-1 to 13-n, the multicast transmission devices 1, and the communication network 31 to which they are connected, are capable of setting up a connection when the identifiers of the network interface devices 13-1 to 13-n and the multicast transmission device 1 are known, and can be provided in any desired forms as long as the multicast function is provided. Here, it is assumed that each of the network interface devices 13-1 to 13-n and the multicast transmission device 1 is assigned with a uniquely identifiable address in E. 164 format, and is formed in an ATM interface specification having a point-to-multipoint connection set up function (as specified in the ATM Forum UNI 3.1 Specification of the ATM Forum, 1994). Also, in the following, a group of devices for receiving the identical multicast message will be collectively referred to as a multicast group.

Figure 7:
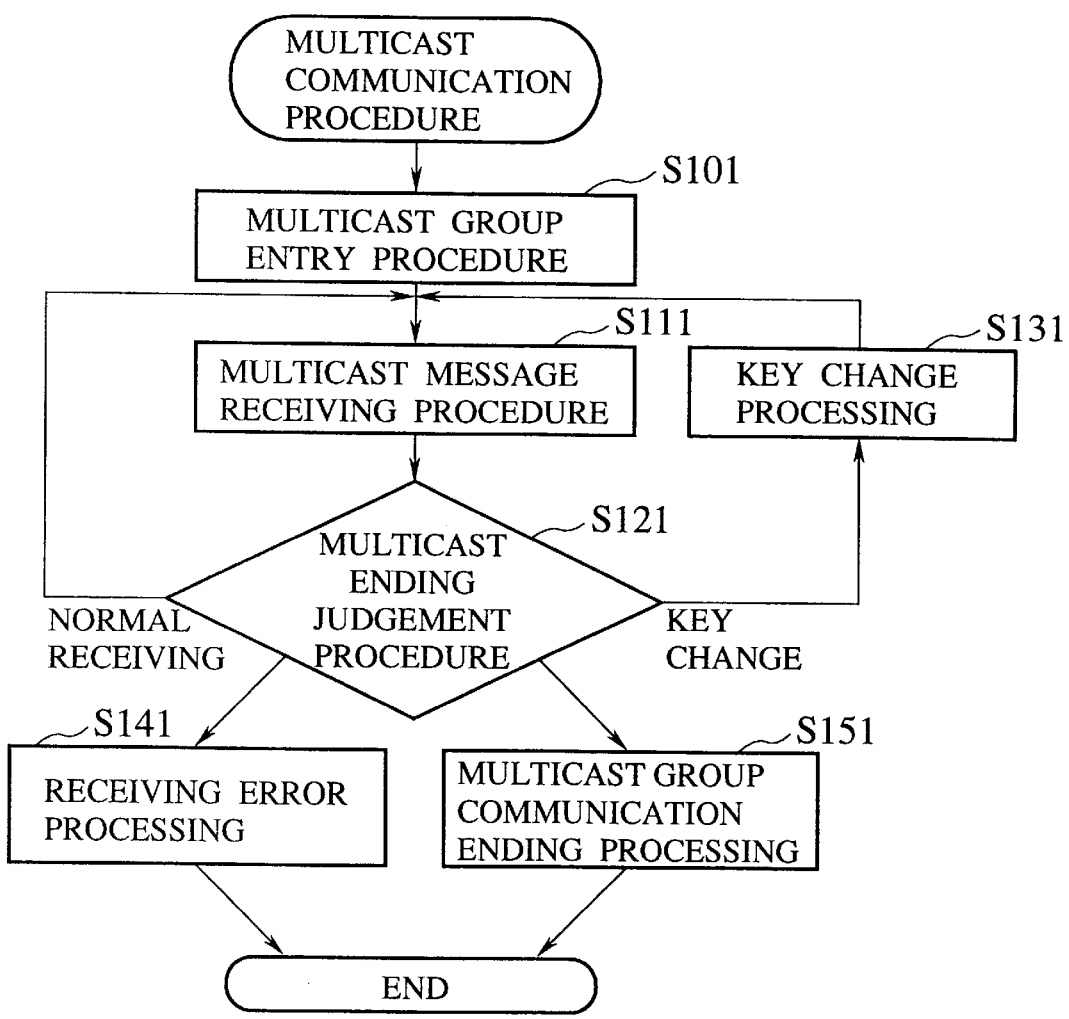
FIG. 7 is a flow chart showing an outline of a multicast communication procedure by a receiving protocol device in the system of FIG. 6.

FIG. 7 is a flow chart showing an outline of the multicast communication procedure by each of the receiving protocol devices 12-1 to 12-n. Here, the multicast communication procedure includes a multicast group entry procedure S101, a multicast message receiving procedure S111 which follows S101, a multicast ending judgement procedure S121 which follows S111 and from which the operation returns to S111 in a case of a normal receiving, a receiving error processing S141 and a multicast group communication ending processing S151 which follows S121, and a key change processing S131 which follows S121 in a case of a key change and from which the operation returns to S111.

Figure 8:
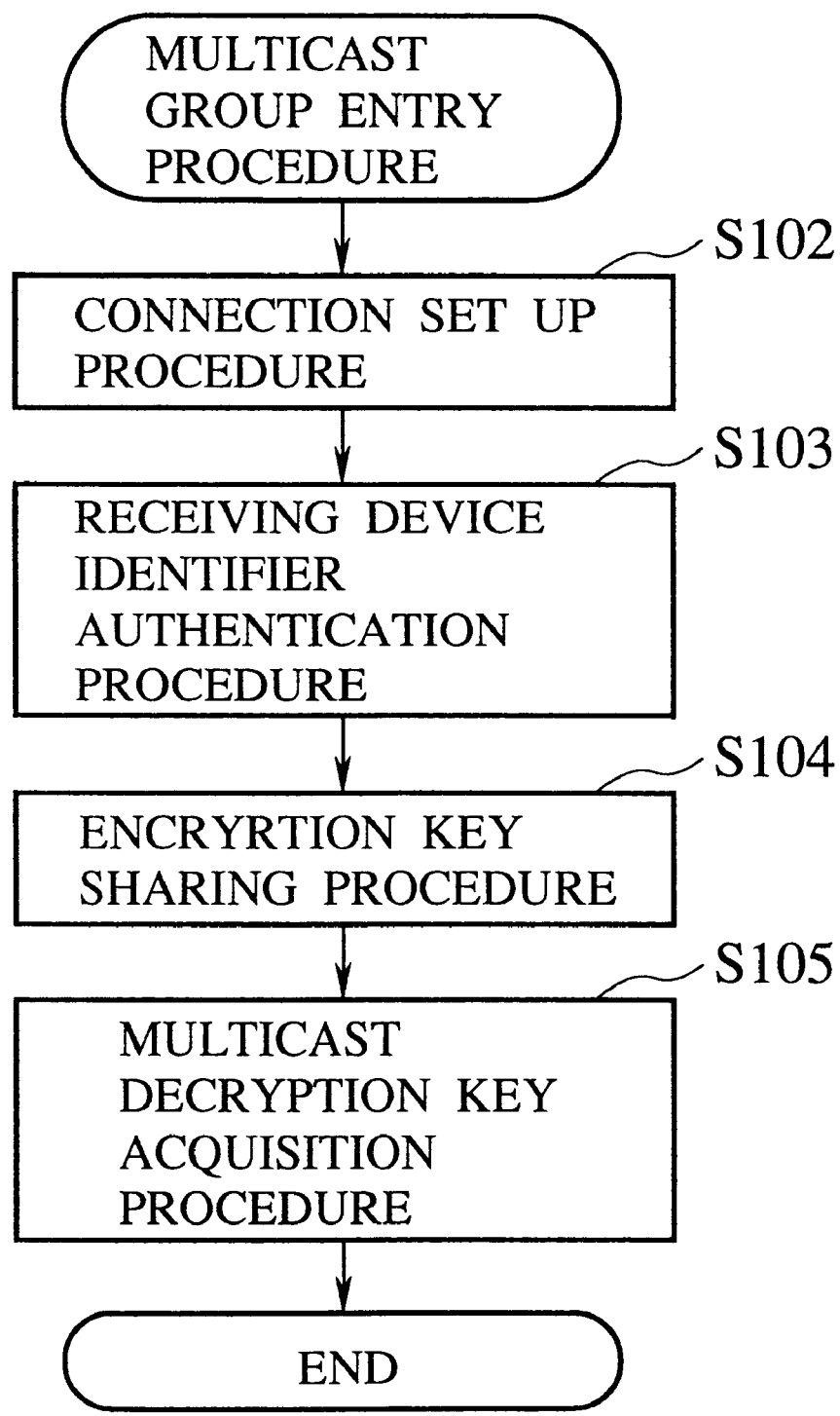
FIG. 8 is a flow chart showing a detail of a multicast group entry procedure by a receiving protocol device in the system of FIG. 6.

FIG. 8 is a flow chart showing a detail of the multicast group entry procedure S101 by each of the receiving protocol devices 12-1 to 12-n. Here, the multicast group entry procedure includes a connection set up procedure S102, a receiving device identifier authentication procedure S103 which follows S102, an encryption key sharing procedure S104 with respect to the multicast transmission deice 1 which follows S103, and a multicast decryption key acquisition procedure S105 which follows S104.

Figure 9:
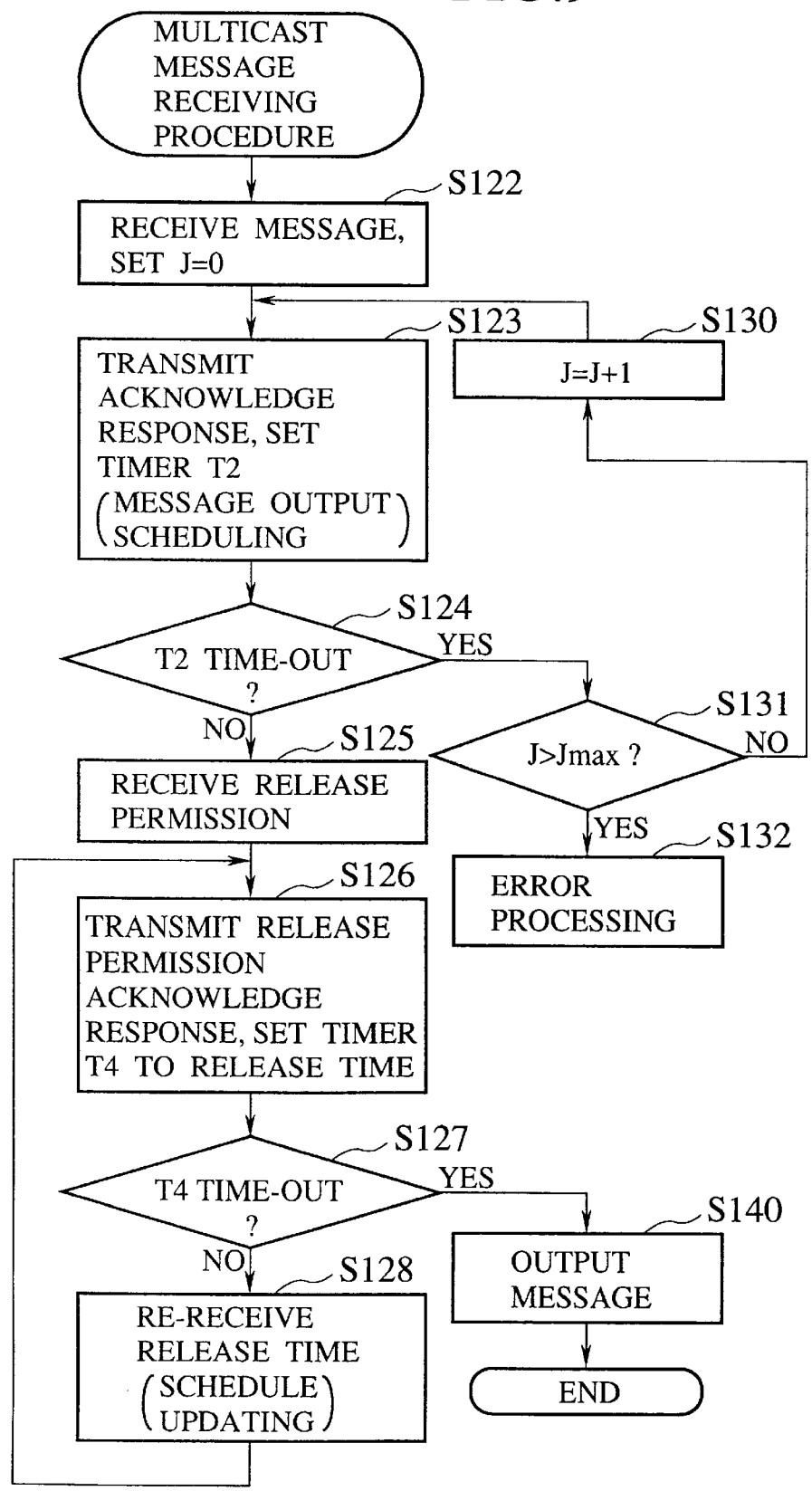
FIG. 9 is a flow chart showing a detail of a multicast message receiving procedure by a receiving protocol device in the system of FIG. 6.

FIG. 9 is a flow chart showing a detail of the multicast message receiving procedure S111 by each of the receiving protocol devices 12-1 to 12-n. Here, the multicast message receiving procedure includes a message receiving step S122 at which a control variable J is initialized to 0, an acknowledge response transmission step S123 which follows S122 and at which a timer T2 is set while a message output scheduling is carried out, a release permission reception time-out judgement step S124 which follows S123 and judges whether a time-out of the timer T2 occurred or not, a release permission receiving step S125 which follows S124 when the time-out of the timer T2 has not occurred, a release permission acknowledge response transmission step S126 which follows S125 and at which a timer T4 is set to a release time, a message output time judgement step S127 which follows S126 and judges whether a time-out of the timer T4 occurred or not, a release time re-receiving step S128 which follows S127 when the time-out of the timer T4 has not occurred and at which a schedule is updated, a message output step S140 which follows S127 when the time-out of the timer T4 occurred, a control variable J judgement step S131 which follows S124 when the time-out of the timer T2 occurred and judges whether the control variable J is greater than Jmax, a control variable J increment step S130 which follows S131 when the control variable J is not greater than Jmax and from which the operation returns to S123, and an error processing S132 which follows S131 when the control variable J is greater than Jmax.

Figure 10:
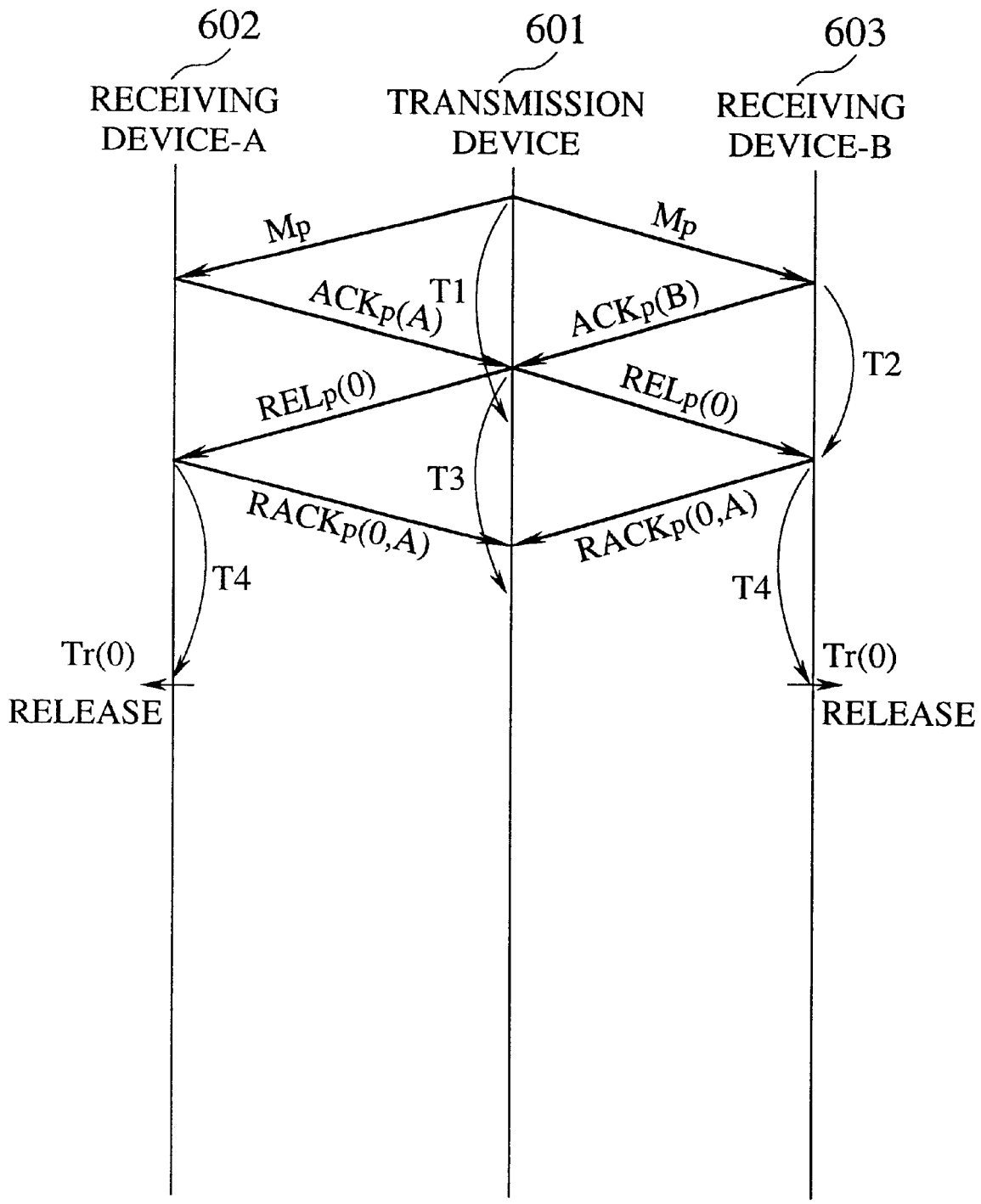
FIG. 10 is a diagram showing a message sequence in a case of normal operation of the multicast message receiving procedure of FIG. 9.

FIG. 10 shows a message sequence in a case of normal operation of the multicast message receiving procedure, among a transmission device 601, a receiving device-A 602, and a receiving device-B 603.

Figure 11:
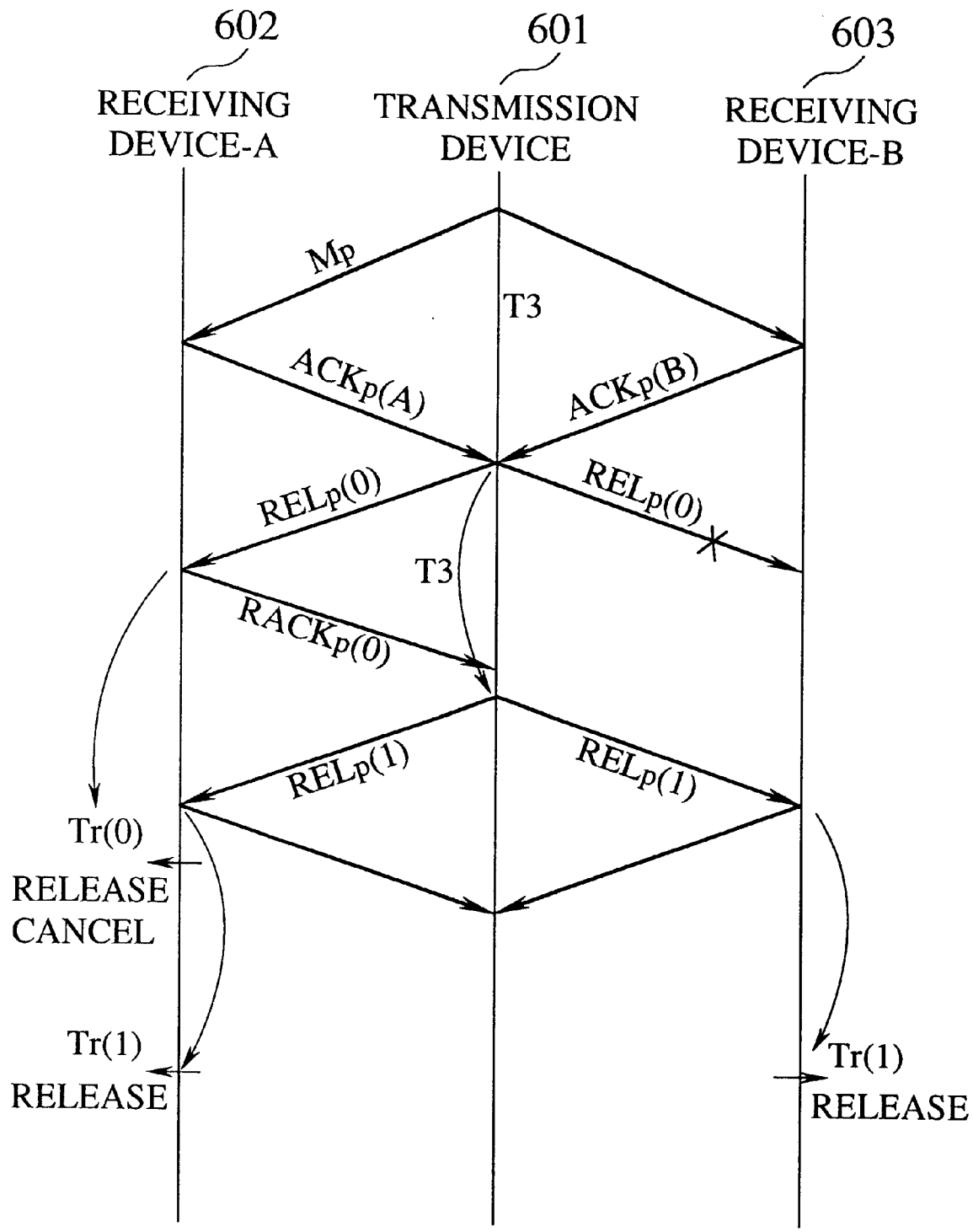
FIG. 11 is a diagram showing a message sequence in a case of a message release permission transfer failure in the multicast message receiving procedure of FIG. 9.

FIG. 11 shows a message sequence in a case of a message release permission transfer failure in the multicast message receiving procedure, among a transmission device 601, a receiving device-A 602, and a receiving device-B 603.

Figure 12:
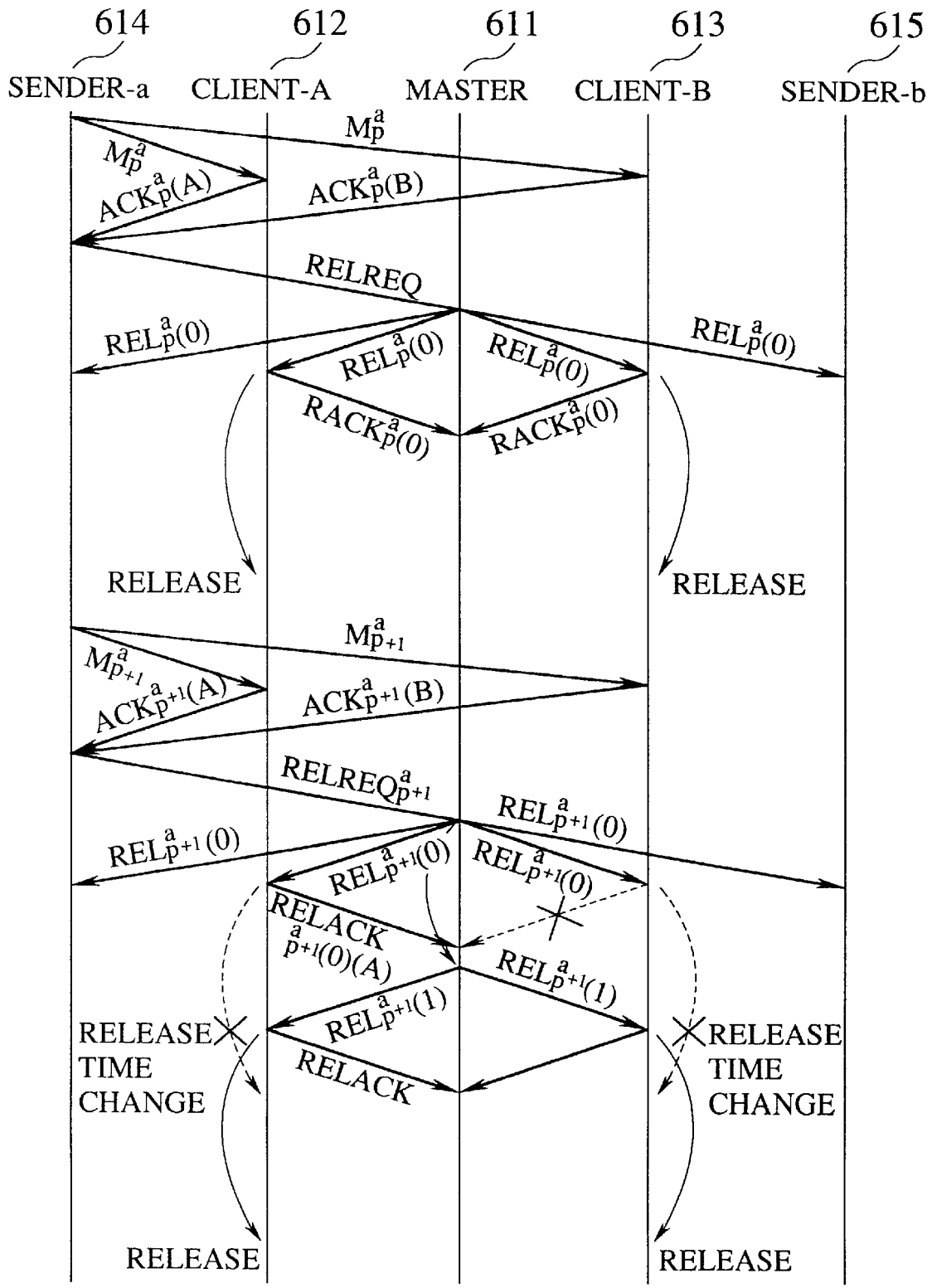
FIG. 12 is a diagram showing a message sequence in a case of obtaining an agreement on a message order among a plurality of senders in the first embodiment of the present invention.

FIG. 12 shows a multicast message sequence in a case of obtaining an agreement on a message order among a plurality of senders, among a master 611, a client-A 612, a client-B 613, a sender-a 614 and a sender-b 615.

Figure 13:
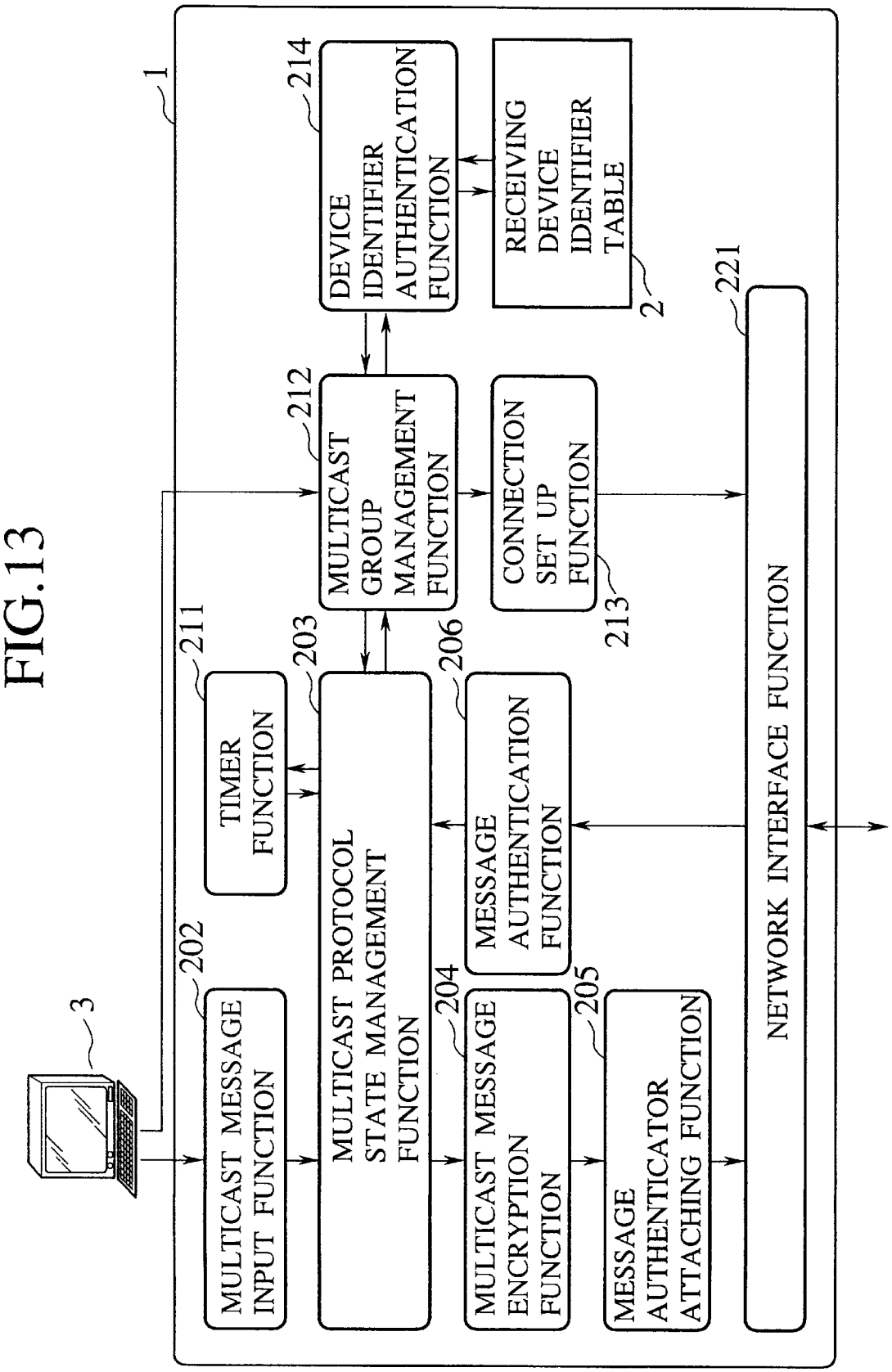
FIG. 13 is a block diagram showing a functional configuration of a multicast transmission device in the system of FIG. 6.

FIG. 13 shows a functional configuration of the multicast transmission device 1 of FIG. 6, which comprises: the receiving device identifier table 2; a multicast message input terminal 3; a multicast message input function 202 connected with the multicast message input terminal 3; a multicast protocol state management function 203 connected with the multicast message input function 202; a multicast message encryption function 204 connected with the multicast protocol state management function 203; a message authenticator attaching function 205 connected with the multicast message encryption function 204; a message authentication function 206 connected with the multicast protocol state management function 203; a timer function 211 connected with the multicast protocol state management function 203; a multicast group management function 212 connected with the multicast message input terminal 3 and the multicast protocol state management function 203; a connection set up function 213 connected with the multicast group management function 212; a device identifier authentication function 213 connected with the multicast group management function 212 and the receiving device identifier table 2; and a network interface function 221 connection with the message authentication attaching function 205, the message authentication function 206, and the connection set up function 213.

Figure 14:
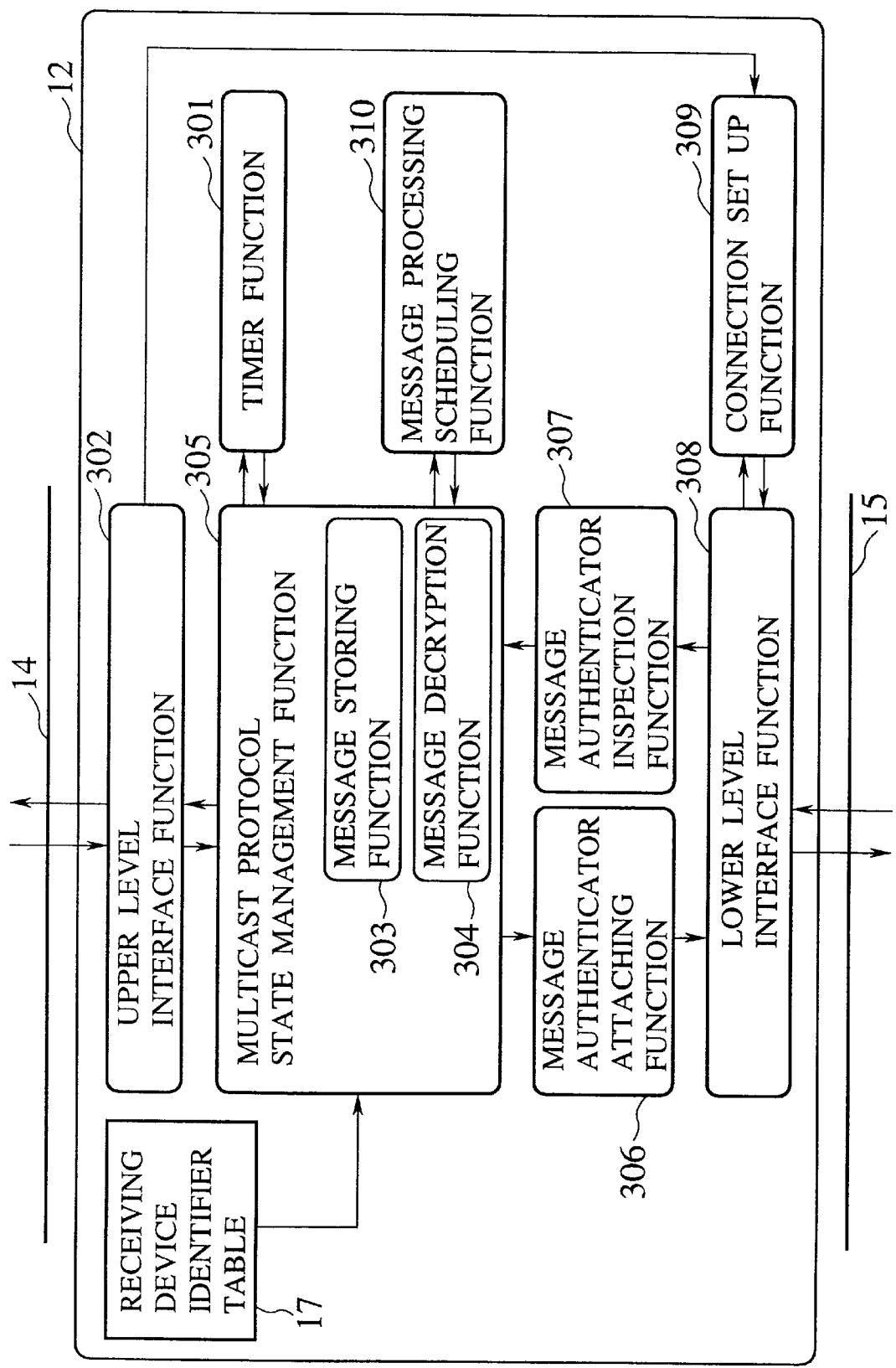
FIG. 14 is a block diagram showing a functional configuration of a receiving protocol device in the system of FIG. 6.

FIG. 14 shows a functional configuration of the receiving protocol device 12 (each of the receiving protocol devices 12-1 to 12-n) of FIG. 6, which comprise: the receiving device identifier table 17; an upper level interface function 302 connected to the upper level interface point 14; a multicast protocol state management function 305 connected with the receiving device identifier table 17, a message storing function 303 and a message decryption function 304 contained in the multicast protocol state management function 305; a timer function 301 connected with the multicast protocol state management function 305; a message processing scheduling function 310 connected with the multicast protocol state management function 305; a message authenticator attaching function 306 connected with the multicast protocol state management function 305; a message authenticator inspection function 307 connected with the multicast protocol state management function 305; a lower level interface function 308 connection with the message authenticator attaining function 306 and the message authentication inspection function 307 and connected to the lower level interface point 15; and a connection set up function 309 connected with the upper level interface function 302 and the lower level interface function 308.

Figure 15:
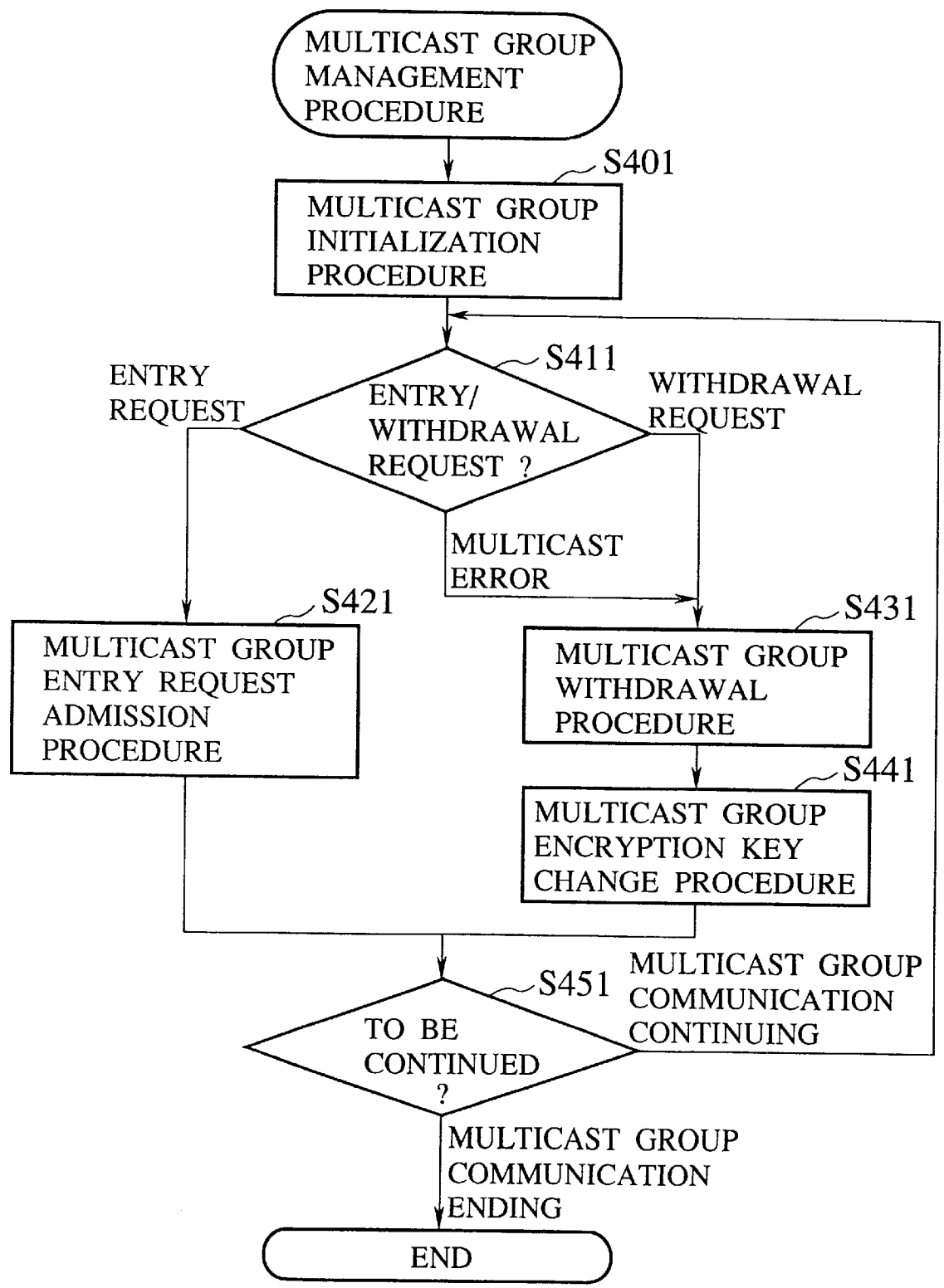
FIG. 15 is a flow chart showing an outline of a multicast group management procedure by a multicast transmission device in the system of FIG. 6.

FIG. 15 is a flow chart showing an outline of the multicast group management procedure by the multicast transmission device 1. Here, the multicast group management procedure includes a multicast group initialization procedure S401, a multicast group entry/withdrawal request judgement procedure S411 which follows S401, a multicast group entry request admission procedure S421 which follows S411 in a case of entry request, a multicast group withdrawal procedure 431 which follows S411 in a case of withdrawal request or multicast error, a multicast group encryption key change procedure S441 which follows S431, and a multicast group communication ending judgement procedure S451 which follows S421 or S441. When the multicast group communication is to be continued at S451, the operation returns to S411.

Figure 16:
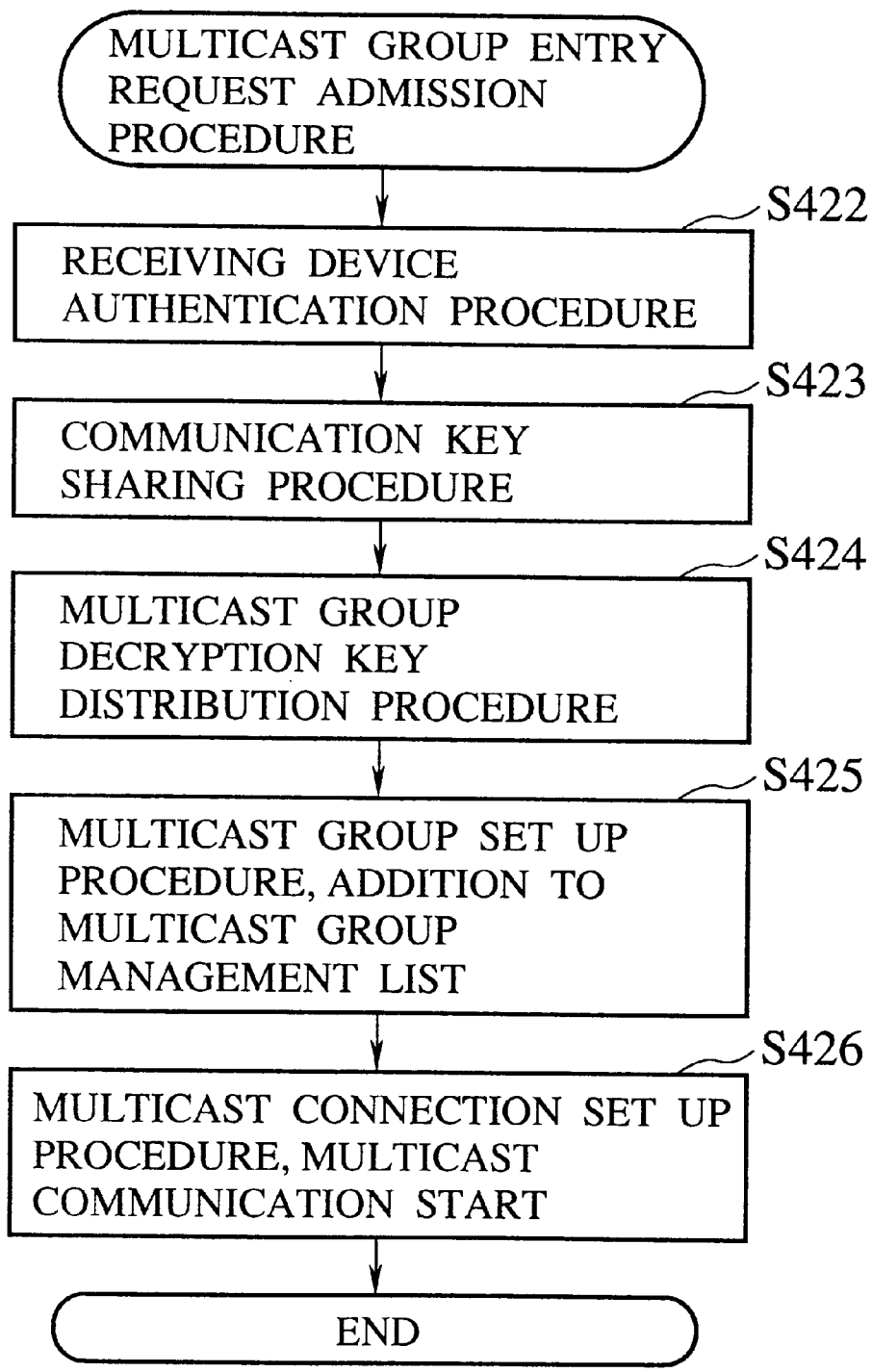
FIG. 16 is a flow chart showing a detail of a multicast group entry request admission procedure by a multicast transmission device in the system of FIG. 6.

FIG. 16 is a flow chart showing a detail of the multicast group entry request admission procedure S421 by the multicast transmission device 1. Here, the multicast group entry request admission procedure includes a receiving device authentication procedure S422, a communication key sharing procedure S423 with respect to the receiving device which follows S422, a multicast group decryption key distribution procedure S424 which follows S423, a multicast group set up procedure S425 which follows S424 and at which an addition to a multicast group management list is made, and a multicast connection set up procedure S426 which follows S425 and at which the multicast communication starts.

Figure 17:
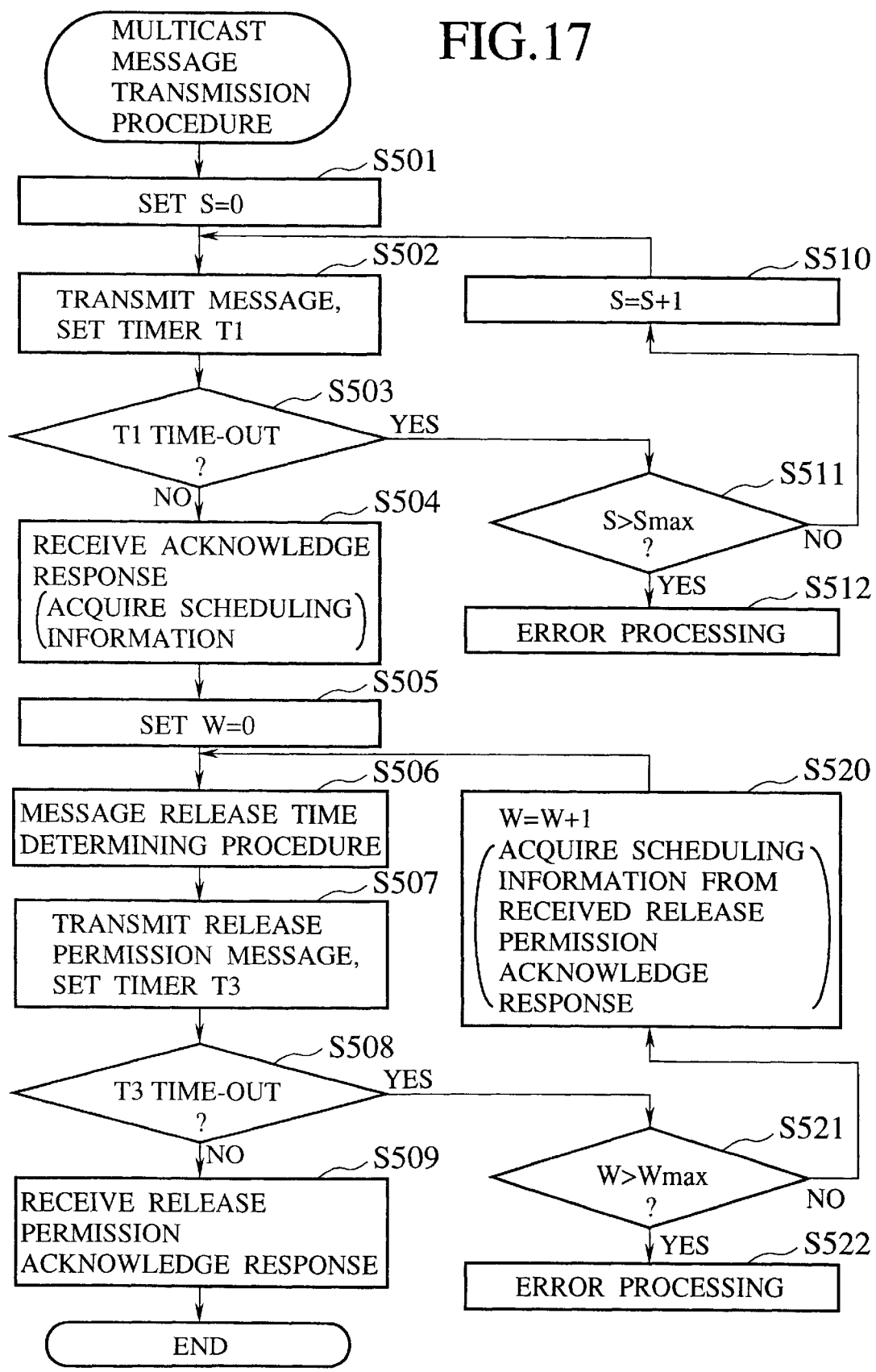
FIG. 17 is a flow chart showing a multicast message transmission procedure by a multicast transmission device in the system of FIG. 6.

FIG. 17 is a flow chart showing a multicast message transmission procedure by the multicast transmission device 1. Here, the multicast message transmission procedure includes a control variable S initialization step S501 at which a control variable S is initialized to 0, a message transmission step S502 which follows S501 and at which a timer T1 is set, an acknowledge response reception time-out judgement step S503 which follows S502 and judges whether a time-out of the timer T1 occurred or not, an acknowledge response receiving step S504 which follows S503 when the time-out of the timer T1 has not occurred, a control variable S judgement step S511 which follows S503 when the time-out of the timer T1 occurred and judges whether the control variable S is greater than Smax, a control variable S increment step S510 which follows S411 when the control variable S is not greater than Smax and from which the operation returns to S502, and an error processing S512 which follows S511 when the control variable S is greater than Smax, a control variable W initialization step S505 which follows S504 and at which a control variable W is initialized to 0, a message release time determining procedure S506 which follows S505, a release permission message transmission procedure S507 which follows S506 and at which a timer T3 is set, a release permission acknowledge response reception time-out judgement procedure S508 which follows S507 and judges whether a time-out of the timer T3 occurred or not, a release permission acknowledge response receiving procedure S509 which follows S508 when the time-out if the timer T3 has not occurred, a control variable W judgement step S521 which follows S508 when the time-out of the timer T3 occurred and judges whether the control variable W is greater than Wmax, a control variable W increment step S520 which follows S521 when the control variable W is not greater than Wmax and from which the operation returns to S506 while a scheduling information is acquired from the received release permission acknowledge response, and an error processing S522 which follows S521 when the control variable W is greater than Wmax.

Figure 18:
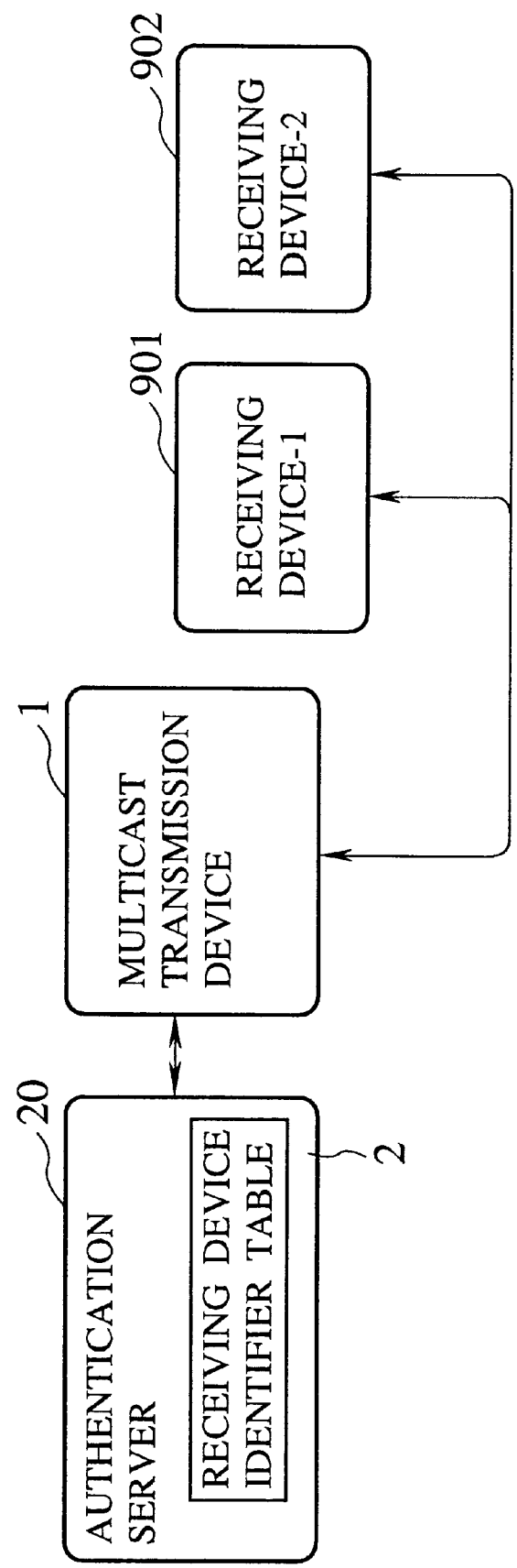
FIG. 18 is a schematic block diagram showing an alternative configuration of a multicast communication system in the first embodiment of the present invention.

FIG. 18 shows a configuration of the multicast communication system in a case of using an authentication server 20 in conjunction with the multicast transmission device 1, a receiving device-1 901, and a receiving device-2 902.

FIG. 19 is a table summarizing a minimum number of processing packets required for delivering one message in six different combinations of a message delivery schemes and release time delivery schemes according to the present invention.

FIG. 20 is a table summarizing definitions of parameters used in the description of the present invention.

Figure 21:
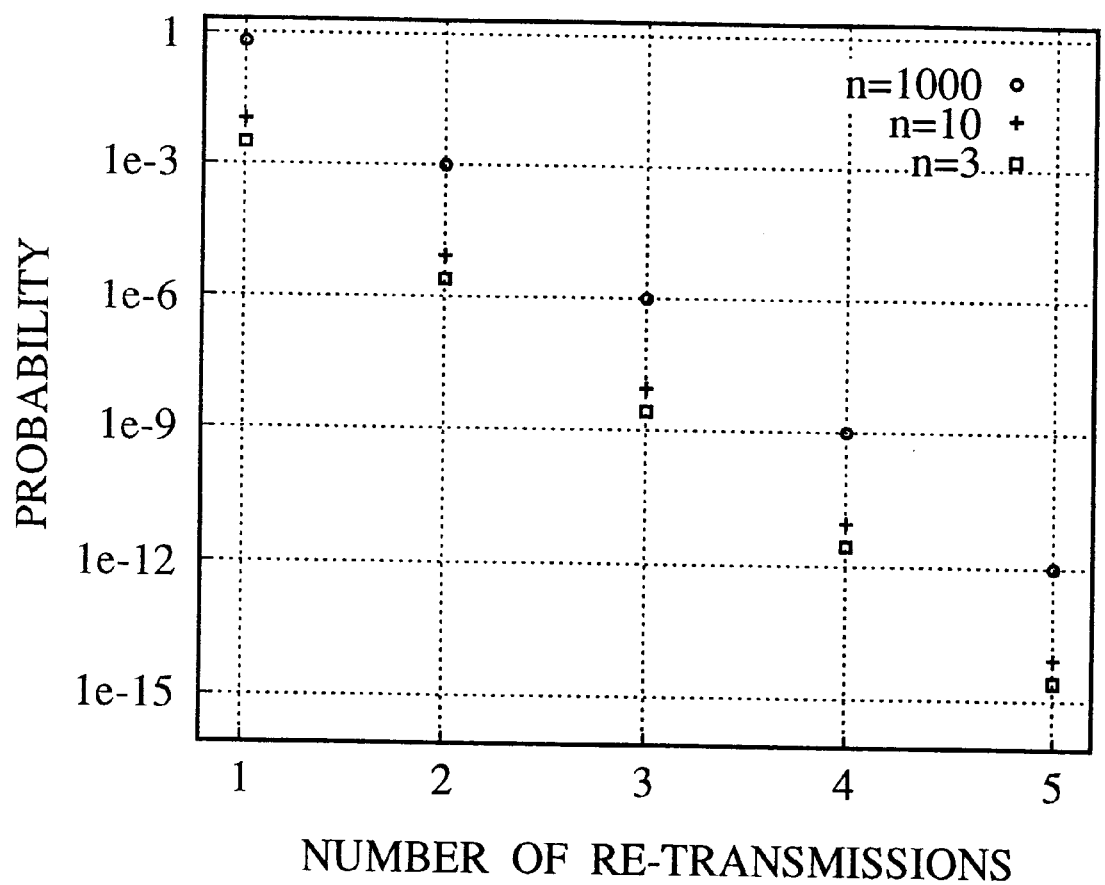
FIG. 21 is a graph showing a relationship between a number of re-transmission and a probability for having a node which cannot receive a message at all in the first embodiment of the present invention.

FIG. 21 is a graph showing a relationship between a number of message re-transmissions and a probability for having a node that fails to receive a message, for three different numbers of terminals according to this first embodiment.

Now, with references to FIG. 6 and FIG. 7, the operation in this first embodiment will be described in detail.

In the following, the operation in this first embodiment will be described in three parts of: a procedure and device configurations for authenticating the the receiving protocol device as a reliable device through a network; a procedure for realizing the identical message release time at the receiving protocol devices; and an application system utilizing this first embodiment.

Also, in the following, a term "message" indicates one meaningful data unit to be exchanged by the multicast transmission device or the receiving protocol device with a multicast transmission device of the same level or a protocol upper level device for guaranteeing the message receiving time. A term "packet" indicates a group of data to be transmitted by the multicast transmission device or the receiving protocol device to a physical network. In this first embodiment, a packet is assumed to be an AAL5 packet. The message is transmitted through a network in a form of one packet or plural packets.

First, the entry into the multicast group will be described. The multicast group has a unique multicast group identifier which is defined in advance, and accessible for anyone as it is publicly disclosed by a telephone directory or a directory service, for example, along with the E.164 address of the corresponding multicast transmission device.

The client device 11 which wishes to carry out the multicast group message receiving first executes the multicast group entry procedure S101. FIG. 8 shows a detailed flow chart of this multicast group entry procedure S101. First, the receiving protocol device 12 carries out the step S102 for setting up a point-to-point connection with respect to the multicast transmission device 1, and starting the multicast group entry procedure. Then the client device 11 prepares a multicast group entry set up request containing the identifier of the desired multicast group and the E.164 address of the corresponding multicast transmission device 1, and sends this multicast group entry set up request to the receiving protocol device 12 through the upper level interface point 14.

At the receiving protocol device 12, when the message sent from the client device 11 is the multicast group entry set up request, the connection set up function 309 of FIG. 14 sends a connection set up message to the network interface device 13. Then, the network interface device 13 transmits this connection set up message to the communication network 31 according to the signaling protocol.

The client device 11 then generates a connection set up message for the multicast transmission device 1 from the E.164 address of the multicast transmission device 1. This connection set up message contains the identifier for indicating the multicast group, and transmitted toward the communication network 31 from the network side interface point 16. This connection set up message is assumed to have a message format as specified in the ATM interface specification (ATM forum UNI 3.1 specification. The ATM Forum, 1994) to which the identifier for indicating the multicast group is added.

By this connection set up message, the point-to-point connection 32 is set up between the receiving protocol device 12 and the multicast transmission device 1. At the same time, the multicast group identifier contained in the connection set up message is sent to the multicast transmission device 1, and the multicast transmission device 1 starts the multicast group entry procedure S421 of FIG. 15.

Next, the multicast transmission device 1 authenticates whether the identifier owned by the receiving protocol device 12 also exists in the identifier table 2 of the multicast transmission device 1 or not. This corresponds to the step S422 of FIG. 18 on the multicast transmission device 1 and the step S103 of FIG. 8 on the receiving protocol device 1201.

Each of the receiving protocol devices 12-1 to 12-n has been guaranteed that its protocol implementation is a proper one at a time of the product shipment by a public organization, and has the receiving device identifier table 17 which stores a secret identifier assigned as a proof of the authenticity. A value of this identifier indicates that the public organization has proven that the device is a proper one, so that in order to prevent the illegal use of its value, its value is protected against a directly reading from the upper level interface point 14 and the lower level interface point 15.

In addition, in order to prevent the illegal reading of the receiving device identifier table 17 in the receiving protocol device 12, a function for detecting a breaking of a case body of the device is provided. The receiving device identifier table 17 is provided by an EEPROM (Electric Erasable Programmable ROM), and erased when the breaking of the case body is detected. This is a known technique as disclosed in Mori, R., Kawahara, M.: "Superdistribution: The Concept and Architecture", IEICE transaction 73(7), 1990, for example.

The multicast transmission device 1 has the receiving device identifier table 2 for the receiving device identifiers which are guaranteed to have proper protocol implementation by the public organization in advance, where this table is managed by the reliable organization.

The receiving protocol device 12 proves that it has the receiving device identifier to the multicast transmission device 1 by means of a communication, without containing the receiving device identifier itself in a part of a message on the network. This is a measure for preventing a stealing of the receiving device identifier by the wiretapping of the communication, or by the falsification of the multicast transmission device for authenticating the receiving protocol device by another transmission device.

Such a protocol is known as the so called zero-knowledge proof, and the representative algorithm includes the Fiat-Shamir algorithm as disclosed in Fiat, A., Shamir, A.: "How to prove yourself: practical solution to identification and signature problems", Proc. of CRYPTO 86, Springer-Verlag, Berlin, 1987.

In this first embodiment, the receiving protocol device 12 has a receiving device identifier s and a large integer n, in accordance with the Fiat-Shamir algorithm. On the other hand, the receiving device identifier table 2 stores a root of the receiving device identifier s in modulo n, that is v: $s=v^2$ (mod n).

The multicast transmission device 1 checks that the receiving protocol device 12 has the receiving device identifier s by using the zero-knowledge proof protocol, and confirms that a value v: $s=v^2$ (mod n) obtained for proof is actually existing in the receiving device identifier table 2, so as to confirm that this receiving device identifier is an identifier given by the reliable organization. As long as the factorization of n is difficult, it is difficult to know what the receiving device identifier s is even when v: $s=v^2$ (mod n) is known, so that the receiving device identifier s is safe.

Here, instead of providing the receiving device identifier table 2 in each multicast transmission device 1, it is also possible to modify the system as shown in FIG. 18, in which this authentication is carried out by inquiring an authentication server 20 which has the receiving device identifier table 2. In carrying out the authentication, the multicast transmission device 1 relays the message exchange between the authentication server 20 and a receiving device, and obtains the final authentication result from the authentication server 20. According to this scheme, there is no need for each multicast transmission device 1 to have the receiving device identifier table 2.

Next, the step S104 of FIG. 8 for sharing the secret key between the multicast transmission device 1 and the receiving protocol device 12 is carried out. This corresponds to the step S423 of FIG. 16 on the multicast transmission device 1. There is also a well known scheme for this procedure, as disclosed in Diffie, W., Hellman, H.: "New directions in cyrptography", IEEE transaction of information theory 6, pp. 644–654, 1976. In this scheme, the multicast transmission device 1 and the receiving protocol device 12 are required to share a sufficiently large prime number p and a primitive root α on GF(p) in advance. These values can be publicly disclosed without damaging the safety, so that the multicast transmission device 1 transfers these values to the receiving protocol device 12 at the beginning of the execution of this step.

It is possible to consider the pretending attack in which the processing up to the step S103 is carried out by the receiving protocol device 12 having the legitimate identifier, and the processing from the secret key sharing step S104 on is carried out by an illegitimate device. In order to prevent this attack, it is preferable for the multicast transmission device 1 to continue the authentication as to whether the receiving protocol device 12 has the legitimate identifier or not at the secret key sharing step S104 following the step S103 for confirming that the receiving protocol device 12 has the legitimate identifier at the step S103.

Thereafter, when the secret key sharing steps S104 and S423 are finished and the common secret key K1 between the multicast transmission device 1 and the receiving protocol device 12 is generated, the receiving protocol device attaches an authenticator to the transmission message by using the secret key K1, so as to prevent the message alteration and the pretending attack. The multicast transmission device inspects the authentication attached to the message by using the common secret key, and discards the received packet when the illegality is recognized.

Next, the multicast transmission device 1 transmits a decryption key K for the multicast transmission message which is encrypted by using the secret key K1 to the receiving protocol device 12, and the receiving protocol device 12 carries out the step S105 for receiving this decryption key K. As the encryption algorithm in this case, the usual secret key cryptosystem such as DES can be used. This corresponds to the step S424 of FIG. 16 on the multicast transmission device 1.

The reason for using such a two stage procedure is the following. The key K1 which is shared first is common only between the multicast transmission device 1 and the receiving protocol device 12. The other multicast protocol devices 12 belonging to the same multicast group have respective keys K2, . . . , Kn. In order to carry out the encryption of the multicast message by a single key, it is necessary to have a key which is common to all the receiving protocol devices 12-1 to 12-n.

Now, the multicast group entry procedure from a viewpoint of the multicast transmission device 1 will be described with reference to FIG. 16.

At the multicast transmission device 1, the receiving device authentication step S422 corresponds to the receiving device identifier authentication step of S103 on the receiving protocol device 12 side, and the key sharing step S423 corresponds to the key sharing step S104 on the receiving protocol device 12 side, while the multicast group decryption key distribution step S424 corresponds to the multicast decryption key acquisition step S105 on the receiving protocol device 12 side.

At the multicast transmission device 1, after these steps are carried out sequentially, the step S425 for registering the receiving protocol device 12 to the multicast group is carried out by the multicast group management function 212 of FIG. 13.

Then, by the multicast connection set up function 213, the network interface device 13 to which the receiving protocol device 12 is connected is added to the multicast connection 33. This set up is carried out by the signaling procedure utilizing the information on the E.164 address of the network interface device 13 obtained at the step S102 of the multicast group entry procedure. At this step S426, the receiving protocol device 12 is added to the multicast connection 33, and the multicast communication is started.

This competes the procedure for showing that the receiving protocol device is a reliable device at a time of entry of a terminal into the multicast group.

Next, a message order control and a procedure for realizing an identical release time will be described.

The present invention has an object of realizing the message releasing at an identical time at all the receiving protocol devices contained in the multicast group. There are several schemes for sharing the message release time. Namely, there are six different combinations of the message delivery scheme and the release time delivery scheme. FIG. 19 summarizes these schemes in terms of a minimum number of processing packets required in delivering one message by these schemes. In the following, these schemes will be described in detail. Here, the description will be given for an exemplary case where the multicast transmission device determines the message release time, but a device for transmitting a message to which the determined release time is applied and a device for notifying the determined release time can be separate devices.

First, a "message delivery with acknowledge" scheme is a 2 phase scheme in which the correct delivery of the message content to each terminal is acknowledged, and then the release time (or the release order when a plurality of multicast transmission devices are involved) is determined and notified to each device. The acknowledge response is returned for every packet constituting the message content, so that when the message content comprises m packets, at least 2 m packets are necessary for the transmission of the message content. This scheme can be further subclassified according to a scheme for notifying the release time and a scheme for acknowledging the release time notice. In any of these schemes, a number of repetitions for the release time notice is determined in advance while the release time is set to be later than a time for these repeated notices, and a packet for notifying the release time is repeatedly transmitted to the receiving protocol device, so that all the receiving protocol devices can successfully share the release time at a high probability even under an environment in which the packet delay or loss can occur.

In a case of "with release time acknowledge response", the receiving protocol device returns an acknowledge response to the multicast transmission device for every message for notifying the release time. The multicast transmission device re-transmits the release time notice to a terminal which does not return the acknowledge response. Also when there are many terminals which do not return the acknowledge response, that is, which failed to receive the release time notice, a correction to delay the release time can be made so that the release time notice can be transmitted again.

In a case of "with release result acknowledge", the release time notice is repeated at a prescribed interval. The receiving terminal does not return the acknowledge response one by one, but notifies the releasing of the message at a correct time to the multicast transmission device after the message is released. The multicast transmission device returns the acknowledge response with respect to this notice.

In a case of "without release result acknowledge", an acknowledge of the release result to the multicast transmission device is not used. Even when the realization of identical release time fails, the multicast transmission device cannot learn that fact.

A "message delivery without acknowledge" scheme is a scheme in which the delivery of the message content and the delivery of the release time are carried out simultaneously. This scheme provides a simple scheme for a short message which can be contained within one packet, which realizes the identical release time with a smaller delay compared with the other schemes. It should be noted however that the delivery of the message content is not acknowledged in this scheme, so that the message order control based on the transmission times among a plurality of multicast transmission devices cannot be realized by using this scheme.

In a case of the "with release time acknowledge response" scheme, the message transfer phase is omitted, and a packet containing both the release time and the message is transmitted. As already mentioned above, in this case, the receiving protocol device returns the acknowledge response to the multicast transmission device and the multicast transmission device re-transmits the release time notice to a terminal which does not return the acknowledge response. It should be noted that a number of packets increases considerably when a number of packets constituting the message increases in this case.

In a case of "with release result acknowledge", the release time notice is repeated at a prescribed interval. The receiving terminal does not return the acknowledge response one by one, but notifies the releasing of the message at a correct time to the multicast transmission device after the message is released. The multicast transmission device returns the acknowledge response with respect to this notice.

In a case of "without release result acknowledge", an acknowledge of the release result to the multicast transmission device is not used. Even when the realization of identical release time fails, the multicast transmission device cannot learn that fact.

Figure 1:
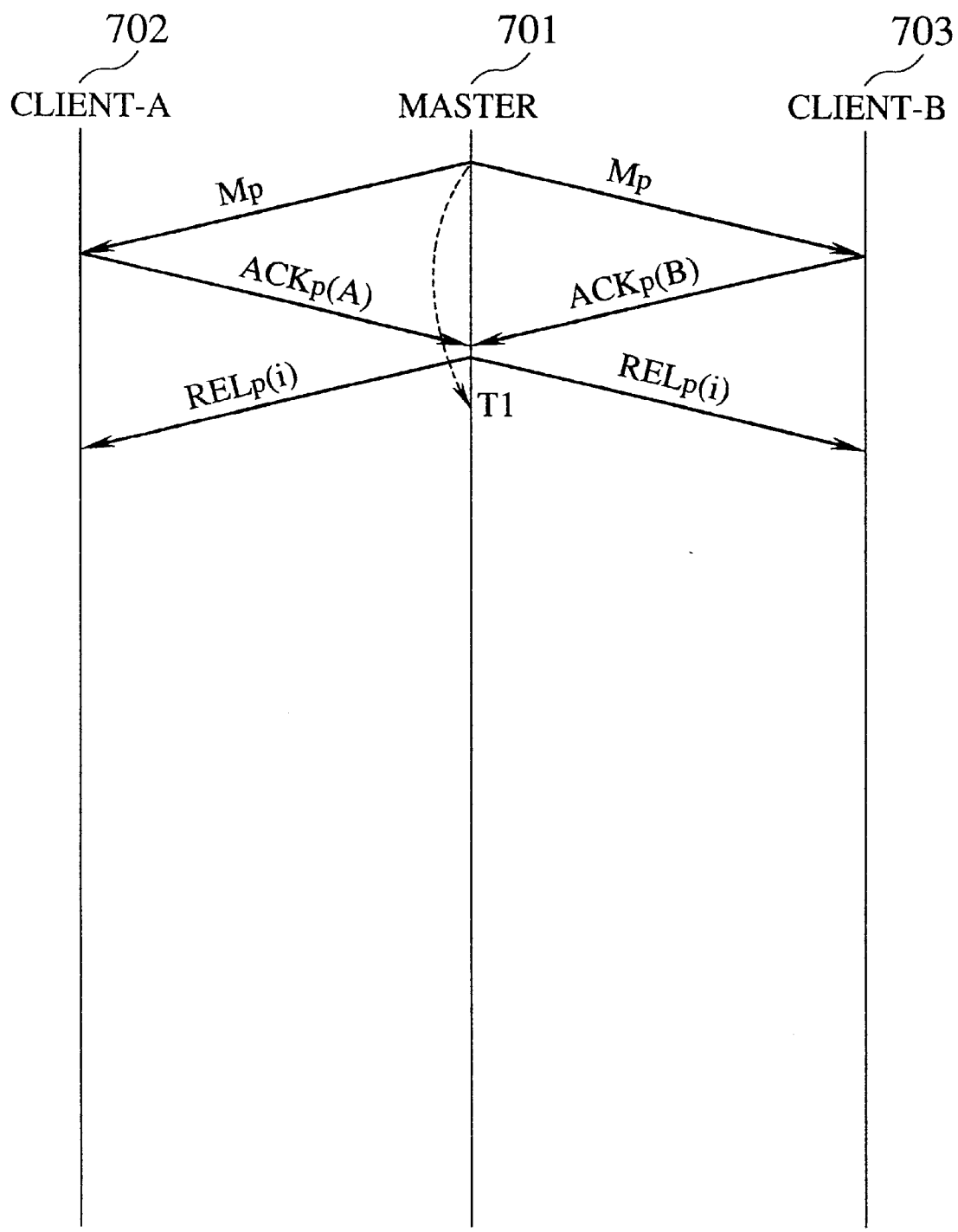
FIG. 1 is a diagram showing a message sequence in a conventional multicast receiving procedure.
Figure 2:
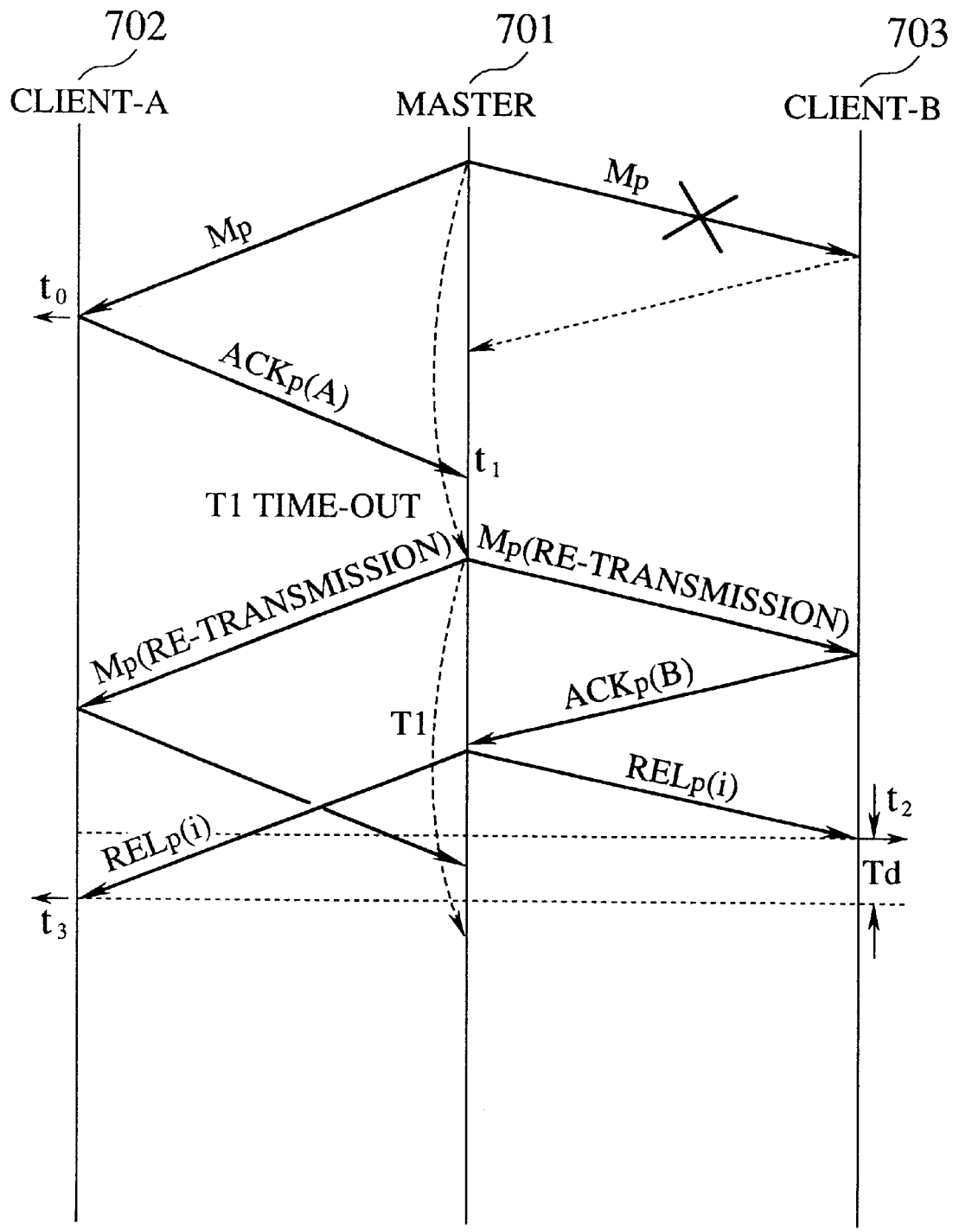
FIG. 2 is a diagram showing a message sequence in a conventional multicast receiving procedure in a case of a message loss.
Figure 3:
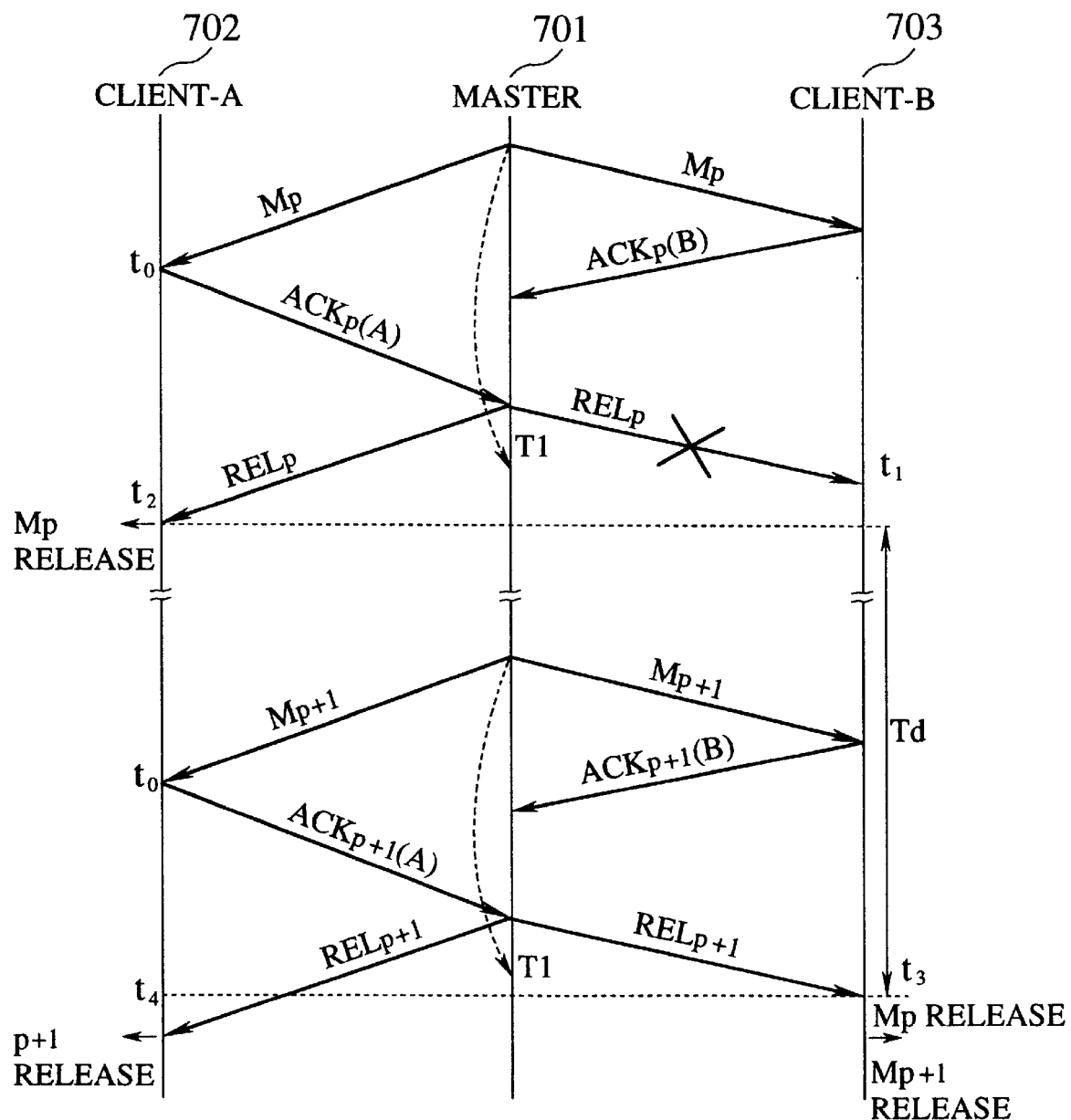
FIG. 3 is a diagram showing a message sequence in a conventional multicast receiving procedure in a case of a release permission message loss.
Figure 4:
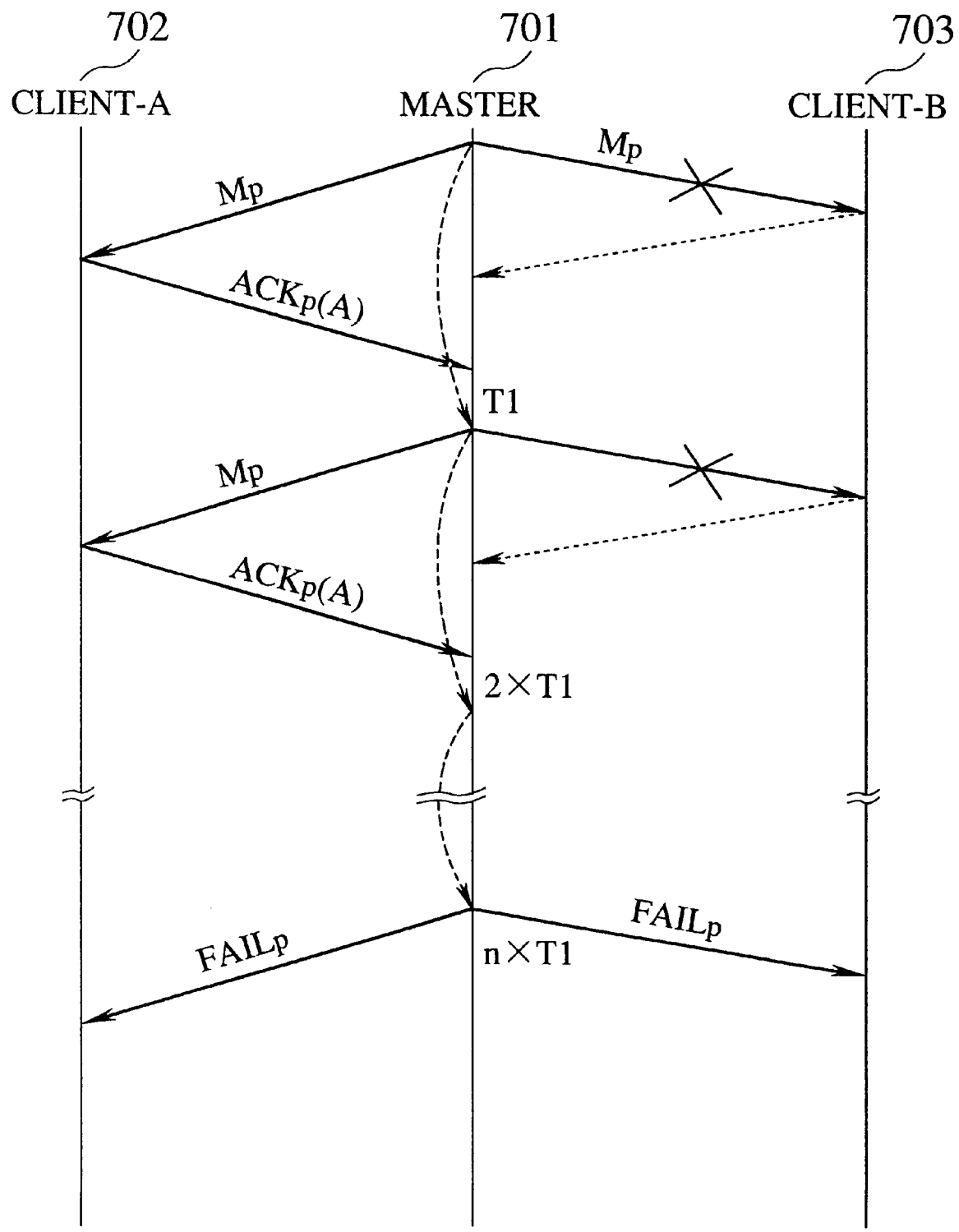
FIG. 4 is a diagram showing a message sequence in a conventional procedure in a case of a message delivery failure.
Figure 5:
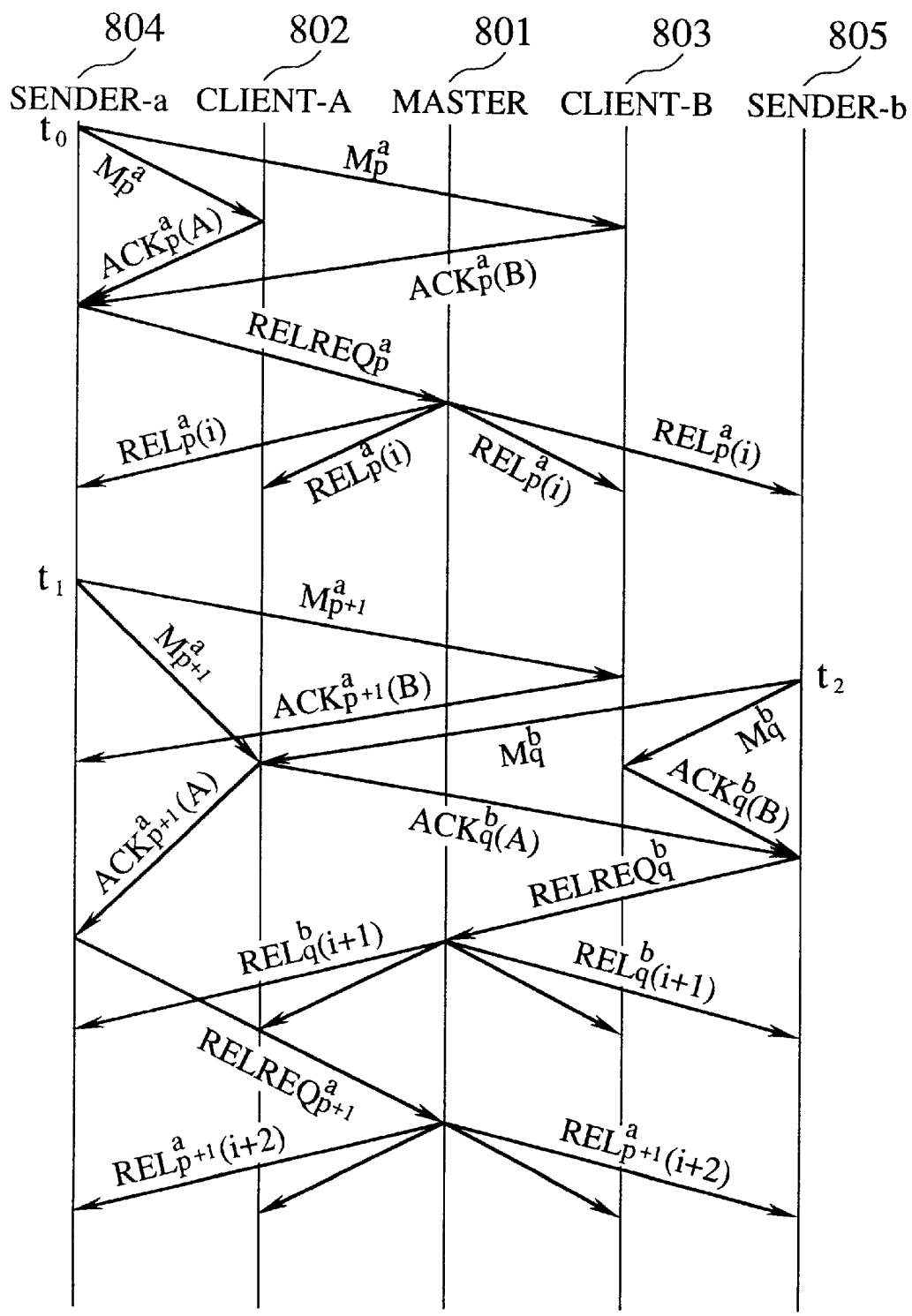
FIG. 5 is a diagram showing a conventional procedure for realizing an identical message receiving order in a multicast network having a plurality of senders.

Next, the transmission and reception of the multicast message will be described with references to FIG. 9, FIG. 17, and FIG. 10, where FIG. 4 shows a flow chart for the reception procedure, FIG. 17 shows a flow chart for the transmission procedure, and FIG. 10 shows a message sequence for the multicast communication.

For the multicast communication which requires the re-transmission procedure, there are various attempts for reducing a number of acknowledge responses for the purpose of carrying out the re-transmission control. The representative examples includes a piggy back in which a number of packets is reduced by incorporating the acknowledge response message into the transmission message, and a scheme for making only a negative acknowledge response when a packet loss is detected (see, Takizawa, M.: "Cluster control protocol for Highly reliable broadcast communication", Proc. of the IFIP Conf. on Distributed Processing, 1987; Internet RFC1301 MTP, 1992: and Melliar-Smith et al.: "Reliable broadcast protocol", U.S. Pat. No. 5,216,675).

In this first embodiment, the first objective is to realize a fair message delivery time for client devices, so that the packet utilization efficiency in the multicast message transfer will not be discussed, and an exemplary case of using a simpler scheme for making the acknowledge response per message (the handshake scheme) will be described. It is to be noted however that it is possible to reduce a number of packets by combining the piggy back or the negative acknowledge response technique to this first embodiment.

At this point, parameters used in the following description will be defined. The parameters defined here are summarized in FIG. 20.

A probability by which a delay time $t_{ij}$ at a time of transferring a packet from one device i to another device j is greater than a certain time $\tau_d$ will be denoted as $P(t_{ij} > \tau_d)$. When the maximum value of the delay time is set to $\tau_d$, a packet delayed beyond that can be regarded as lost. When the maximum value of the delay time is set to $\tau_d$, $P_{loss.ij} = P(t_{ij} > \tau_d)$ will be taken as a message loss rate from a device i to a device j.

Similarly, when $\tau_d$ is given, the maximum value of the loss rate per a single packet is defined as $P_{loss}(\tau_d) = \max\{P_{loss.ij}\}$ for an arbitrary combination of devices constituting the multicast group. Conversely, when the loss rate $P_{loss}$ is given, it is possible to obtain a corresponding maximum value $\tau_{max}$ of the delay time.

Also, a time $RTT_{ij}$ required since a message s sent from a device i to a device j until a processing of a processing time Tp is carried out and a response is returned is given by $RTT_{ij}=t_{ij}+Tp+t_{ji}$, where $t_{ij}$ is a transfer time from a device i to a device j and $t_{ji}$ is a transfer time from a device j to a device i. This $RTT_{ij}$ is assumed to have a distribution $P(RTT_{ij}>\tau)$. When a certain time-out probability $P_{t\ out}$ is defined, Ts which satisfies $P_{t\ out}>P(RTT_{ij}>Ts)$ will be determined.

The loss rate $P_{loss}(\tau_d)$ per packet as defined above fits well for loss rates of packets transmitted at sufficiently large time interval. However, loss rates of packets which are transmitted consecutively or at short interval are expected to be not independent from each other. This is because errors occurring in the network has a tendency to concentrate within a certain period of time. For example, there are possibilities for errors occurring in consecutive packets due to loss of ATM cells caused by the congestion of the network, or bit errors caused by the route change in the transmission link. This phenomenon will be called burst errors in the following.

A probability distribution by which a period of a certain burst error state continues longer than a parameter $\tau$ is denoted as $P_{Burst.ij}(\tau)$, and its maximum value is denoted as $P_{Burst}(\tau_i)$, similarly as in a case of $P_{loss}$. When the burst error exists, if two packets are transmitted consecutively within short period of time, there is a possibility for both of these packets to be lost due to a single burst error, but this can be avoided by providing an interval longer than the burst period in a case of transmitting a packet more than once.

By determining a packet transmission interval $\tau_i$ so as to satisfy $P_{Burst}(\tau_i)<<P_{loss}(\tau)$, the loss rate of the individual message can be regarded as independent and its value can be regarded as $P_{loss}$ at most.

As a parameter which can be changed according to the processing power of the receiving protocol device, a time required since a release message or a message containing both a message and a release time is received until it becomes possible to release a message to an upper level processing device will be denoted as $\tau_{dec}$.

Now, the "message delivery with acknowledge" scheme in a case of "with release time acknowledge response" will be described.

The message transmission sequence starts from the transmission of a message M1 to the multicast connection by the multicast transmission device. Here, the message contains the following information.

multicast message content
message type=message
multicast message identifier
message authenticator The multicast message content contains a message data or a control data entered from the multicast message input function 202 into the multicast protocol management function 203. The message type indicates whether this message M1 contains a message data or a control data. The multicast message identifier is a serial number for indicating an order of multicast messages, which has a sufficiently long period.

The message authenticator is an authenticator for checking that this message M1 has not been altered. Here, a value obtained by encoding the message without the message authenticator, that is, the multicast message content, the message type, and the multicast message identifier in their original forms, by using the multicast secret key K according to a prescribed encoding scheme such as a scheme combining MD5 and DES (See, Koh., J.: "RFC1510: The Kerberos Networks Authentication Service", 1993). Note that the key K common to the multicast group is used as an encryption key for encrypting the message authenticator used in authenticating the multicast communication, so that this message authenticator is different from the key delivery message authenticator. The encoding scheme to be used may be the same for both authenticators.

All fields of this message M1 are encrypted by using the key K at the encryption function 204 and multicast. At the receiving side, the authenticator is calculated from the message without the message authenticator portion by using the key K, and when the calculated value coincides with the message authenticator of the message, it is judged that the message and the protocol information such as a multicast message identifier have not been altered, and the subsequent processing is carried out. In the following, the attaching of the authenticator at a time of transmission and the inspection of the authenticator at a time of reception will be omitted. If the message does not have an authenticator, when a part of message such as a position on a message which corresponds to a cipertext corresponding to the specific message identifier value becomes known, it is possible to alter the protocol information by substituting that part alone. However, by including the authenticator which is an information that cannot possibly be known unless an information on the entire message and the key information are available, it becomes possible to detect a partial alteration of the message.

At the step S501 of FIG. 17, the multicast transmission device increments the message identifier by one, from p to p+1. Then, the control variable S of the message p is initialized to 0. The control variable S is actually distinct for each message, but it is denoted simply as S here for the sake of simplicity.

At the step S502 of FIG. 17, the multicast transmission device multicasts a message Mp having a message type=message. At the same time, the multicast transmission device sets the timer T1 to Ts later from the current time.

The receiving protocol device receives this message with the message identifier p at the step S122 of FIG. 9, and initializes the control variable J similar to the transmission side control variable S to 0. Then, the acknowledge response ACKp(1) is transmitted to the (master) multicast transmission device at the step S123.

Here, the acknowledge response ACKp(A) contains at least the following information.

message type=acknowledge
message identifier
receiving device identifier
message authenticator This acknowledge response ACKp(A) is encrypted by using the key K similarly as the transmission message.

The multicast transmission device then receives this acknowledge response, and when all the acknowledge responses for a message with a message identifier p are received from the multicast group, the next step 505 is carried out. When all the acknowledge responses are not received by the time set to the timer T1, the multicast transmission devices judges it as a time-out at the step S503. Then, whether the control variable S is less than a prescribed value Smax or not is judged at the step S511, and when S is less than Smax, the control variable S is incremented by one at the step S510 and the message re-transmission is carried out.

At the receiving side, even when the received message is judged as already received one according to the message identifier, the acknowledge response is transmitted again. This is done because there are cases in which the message was successfully received by the receiving side but the acknowledge response is lost so that the transmission side judges that the receiving side failed to received the message. At the transmission side, the probability of having a time-out for the acknowledge response is less than $P_{t\ out}$ because the timer T1 is set to Ts. The probability for some terminal to fail to receive the message as all of the Smax times repeated transmissions fail is $(P_{t\ out})^{Smax}$. When there are n terminals, the probability for more than one terminals to fail to receive the message is $(1-(P_{t\ out}))^{Smax})^n$. Consequently, by increasing Smax, it is possible to lower the probability for the reception failure as low as desired. However, when Smax is increased, the message delivery delay time also increases, so that there is a reception failure probability vs. message delivery delay time tradeoff. FIG. 21 is a graph showing a relationship between a number of re-transmissions and a probability for having anode which cannot receive a message at all, for three different cases of n=3, 10, and 1000, in a case of $P_{loss}=10^{-3}$. If the requirement is to have the delivery failure rate of less than $10^{-12}$ when the message loss rate is $10^{-3}$ and a number of nodes is 1000, it suffices to set a number of re-transmissions to be more than five times, for example.

When the control variable S exceeds Smax, the error processing is carried out at the step S512. Here, the error processing can be either a processing for handling the transmission of that message as a failure and a processing for judging the receiving protocol device from which the acknowledge response was not received as malfunctioning and dismissing this receiving protocol device from the multicast group. This error processing will be described in further detail below.

Next, a relationship between the error processing and the upper level application will be described. When an error occurs, the following three options are available.

An occurrence of an error is notified to the upper level application while the multicast group is maintained (as in a case of distributing data for the electronic conference system).

A terminal which failed to receive the message is dismissed from the multicast group while the multicast group is maintained (as in a case of news delivery).

The multicast communication by the multicast group is ended (as in a case of application interruption, or the bank account distributed management system).

After the acknowledge responses from all the receiving protocol devices are received, at the step S505, the control variable W is initialized to 0. When there is another unreleased message which has a younger message identifier than this message, the determination of the release time is waited until the release time notification for the release time of the unreleased message is completed. When this waiting state is ended, at the step S506, the release time of this message is set up. Here, the release time is determined as follows.

Let $\tau_{dec}$ be a time required since the receiving protocol device receives the release message until it becomes possible to output packets to the upper level device, and Wmax be the maximum number of re-transmissions. also, let Ts be a time-out time for the acknowledge response, and T be a time of the release message transmission. Then, the release time Tr of the message is given by the following expression.

$$Tr(p)=T+Wmax \cdot Ts+\tau_{dec}$$

Similarly as in a case of the message, Wmax is set so that $(1-(P_{t\ out})^{Wmax})^n$ does not exceed the tolerable value of the time delivery failure probability. Here, the time-out time Ts is longer than the packet transmission interval $\tau_i$ by which the burst error can be avoided. Namely, it is assumed that $Ts \geq \tau_i$ holds. If $Ts < \tau_i$, the timer T3 described below will be set to $\tau_i$. By determining the message release time as described above, the release order is in an order of release message issue time T, so that the message release order is observed correctly.

At a time of determining the message release time, it is also possible to add a scheduling condition for a time of outputting the message from the receiving protocol device to the client device as described below.

When a plurality of multicast communications are accommodated at the receiving protocol device, there are cases in which a conflict arises among the multicast groups as to the utilization of resources such as the upper level interface of the message decryption function. In order to avoid this conflict, an information for indicating which timing is available at a time of acknowledge response transmission is attached to the acknowledge response message the step S123 of FIG. 9, and a scheduled message release time is set as a time at which the message can be outputted to the client devices as sufficient resources can be allocated at all the receiving protocol devices of the multicast group.

In this manner, it is possible to guarantee the release time at all the receiving protocol devices even when a plurality of multicast groups are handled. This multicast transmission device acquires the scheduling information at the acknowledge response receiving step S504 of FIG. 17. In this case, there is a need to select the release time so as not to reverse the message release order.

In a case of accounting for the scheduling condition, the acknowledge response message contains at least the following information.

message type=acknowledge message identifier receiving device identifier message scheduling information message authenticator When the receiving time is determined, the multicast transmission device multicasts the release permission message RELp(i), where p indicates a corresponding transmission message and i indicates an identifier of the release permission message. The release permission message contains at least the following information.

message type=release message identifier release message identifier scheduled message release time=Tr(i)

message authenticator

At the same time as the transmission of the release permission message, the multicast transmission device sets the timer T3 to Ts later from the current time at the step S507.

At the receiving protocol device, the release permission message RELp(0) is received at the step S125 of FIG. 9. When the release permission message is not received before the time-out of the timer T2 occurs, the processing steps S131, S130 and S132 which are similar to the acknowledge response time-out processing at the multicast transmission device sides are carried out.

When the release permission message is received, the receiving protocol device executes the step S126 to transmit the release permission acknowledge response RACKp(i, A) to the multicast transmission device, where i indicates the release message identifier and A indicates the receiving device identifier. Then, the timer T4 is set to the scheduled release time contained in the release permission message.

The release permission acknowledge response contains at least the following information.

message type=release acknowledge
message identifier
release message identifier
receiving device identifier
message authenticator In addition to these, it is also possible to add an updated message scheduling information to the release permission acknowledge response, in anticipation of the release permission acknowledge response reception failure. In this case, the receiving protocol device acquires the scheduling information again and transmits the release permission acknowledge response at the step S126 of FIG. 9.

Now, When the release permission acknowledge responses from all the receiving protocol devices are received before the time-out of the timer T3, the multicast transmission device normally finishes the transmission processing.

At the receiving protocol device, when the release permission RELp(i+1) for this message is not received again from the multicast transmission device before the time-out time of the timer T4, that is, the release time, the step S140 of FIG. 9 is carried out and the decrypted message is outputted to the client device through the upper level interface at the release time Tr(i). This completes the reception of the message p.

The decryption of the message can be carried out at any time between an initial receiving of the message and a message output, as long as it is not later than the release time. Depending on an order of operations in this regard, an arrangement of the message decryption function 304 and the message storing function 303 of FIG. 14 should be modified.

The primary aim for making the release permission acknowledge response at the receiving protocol device is to reduce wasteful re-transmissions by carrying out the release permission message re-transmission selectively at the multicast transmission device.

In addition, by making the acknowledge response, it is possible for the multicast transmission device to know how many of the receiving protocol devices have successfully received the release permission message, so that the release time can be postponed when a number of receiving protocol devices that have successfully received the release permission message is small. This is done by notifying the corrected release time to those receiving protocol devices which have already received the release permission message.

As a condition for postponing the release time, it is possible to use a condition that the release time is postponed when a prescribed ratio (such as more than a half) of the receiving protocol devices have not received the release permission message successfully when the multicast transmission device has completed the acknowledge response receiving processing for a half of Wmax times. By notifying the corrected release time at this point, it can be expected that even those receiving protocol devices which already received the original release time can receive the corrected release time before the original release time comes.

Note however that there is a possibility for the reversal of the message release order when this correction of the release time is used. This problem can be resolved by either one of the following two methods. One is to delay the notification of the release time for the next message until the release time of the current message is completely ascertained. Another is to correct the release time of the subsequent message when the release time of the current message is corrected.

Next, a case in which a plurality of multicast transmission devices exist in one multicast group will be described. When a plurality of multicast transmission devices exist, in order to realize the identical receiving order within the multicast group for the messages transmitted by these multicast transmission devices, it is possible to utilize the conventionally known technique directly. A scheme for determining the message release time as described above can be carried out after the receiving order is ascertained in an obvious manner. FIG. 12 shows the message sequence for a case in which a plurality of transmission devices (senders) exist and one master determines the receiving order.

It is to be noted that the multicast transmission device and the receiving protocol device are described separately in the above for the sake of clarity, but it is also possible to adopt a scheme in which the multicast transmission device and the receiving protocol device have the same network address, or a scheme in which the multicast transmission device and the receiving protocol device are housed inside a single case and the device authentication is carried out collectively. The multicast group entry procedure is to be carried out with respect to the sole master in the multicast group, and the members and keys of the multicast group are to be centrally managed by the master.

Here, the problem of the manipulation of the receiving order by the illegal protocol operation as encountered in the prior art does not occur because the proper protocol operation is guaranteed by the authentication of the device.

Also, when it is required to reflect the message transmission time of the multicast transmission device into the message receiving order so as to secure the fairness, it is also possible to determine the receiving order according to the absolute time attached to the transmission message.

Next, the withdrawal of a receiver from the multicast group will be described. When a certain receiver wishes to withdraw from the multicast group, the receiving protocol device of this receiver has the decryption key of this multicast group, so that there is a need to change the decryption key.

Next, the change of the encryption key will be described. The distribution of the changed encryption key is realized by sending an encrypted message using a key for key distribution provided for each receiving protocol device, through a connection provided for each receiving protocol device. This corresponds to the steps S431 and S441 of FIG. 15.

There are various known time synchronization methods. For example, a method disclosed in Mills, D. L.: "Network Time Protocol", IETF RFC1059, 1988 is a known standard in the Internet which is mainly the packet exchange network. Also, the frame period of the physical transmission line connected to the public network is synchronized with the atomic timer so that it is extremely accurate, and it can be utilized to realize a high precision in the time synchronization. It is also possible to obtain an accurate time by providing a receiver of the GPS (Global Positioning System) within the tamper resistant device.

Regarding the time synchronization, it is preferable to establish the synchronization that satisfies the required precision before the start of the multicast communication, and re-establish the synchronization regularly while the multicast communication is continued.

Next, the penalty in the release time calculation will be described. There are cases in which the order of responses with respect to a certain multicast message bears an important meaning. A typical example is a case of bidding. For such an application, it is possible to secure the fairness by setting the message release time so as to compensate for the response delay time, rather than trying to make the delivery time identical.

Next, the malfunction log storing will be described. The present invention is suitable for a field in which the high level fairness regarding the message delivery time is required, such as that of the electronic commercial transactions, and in a practical implementation, the influence of the device malfunction can be significant.

For example, when the present invention is utilized for the stock transaction, if the transaction is hindered by the device malfunction, a considerable damage can be caused to a user. The similar situation also arises in a case of the malfunction at the network side.

In this regard, the devices of the present invention can be more safely operated as follows. Namely, a self device diagnosis result is stored within the device. Then, this self device diagnosis result is inspected by a reliable third person, and when it is judged that there is a device malfunction, an insured amount can be received from the insurance organization for any damage caused by the device malfunction. Of course, the malfunction information should be protected against the rewriting by a user.

As for the malfunction of the public network, by receiving the malfunction information from the public network and storing it inside the device, it becomes possible to prove the malfunction at the network side. The transfer of the malfunction information can be realized by using the OAM cell or the overhead data in a frame of the physical layer in a case of ATM. The network side can prevent the alteration of the malfunction information by providing the malfunction information on malfunctioned device, malfunction time, etc. in an encrypted form.

Conversely, by matching the records kept at the device side and the network side, it is possible to detect an intentional act for placing the device in an inoperative state, such as the power shutting off or the transmission line disconnecting, so that the network service vender will not be requested to compensate for the damages caused by such an improper inability to utilize the service. Of course, it is practically impossible to detect and record all the malfunctions, but by combining the above described methods for the detectable malfunctions, it becomes possible to clarify the parties responsible for the malfunction and reduce the burden on the user.

Figure 22:
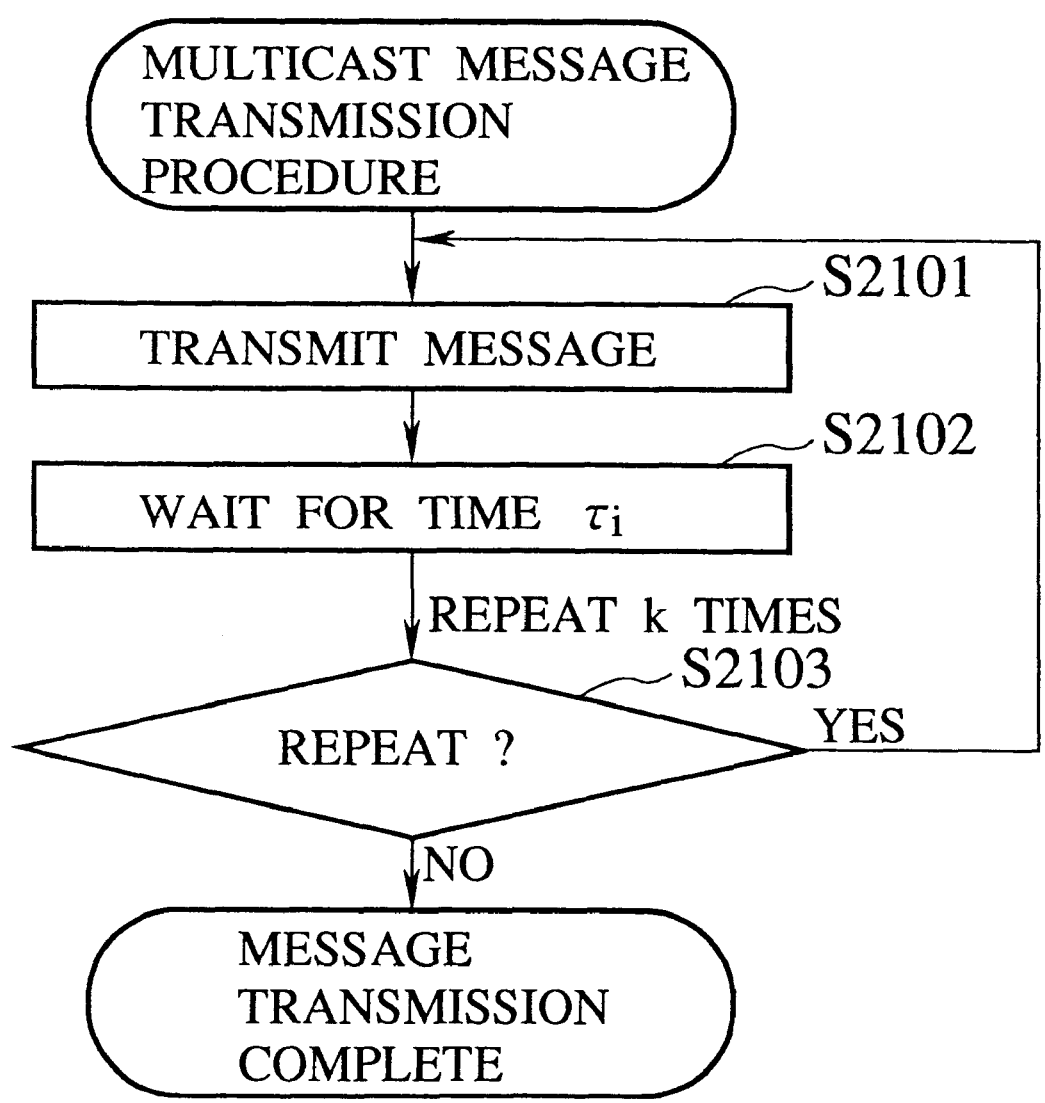
FIG. 22 is a flow chart showing a message transmission procedure by a message transmission device in the second embodiment of the present invention.
Figure 23:
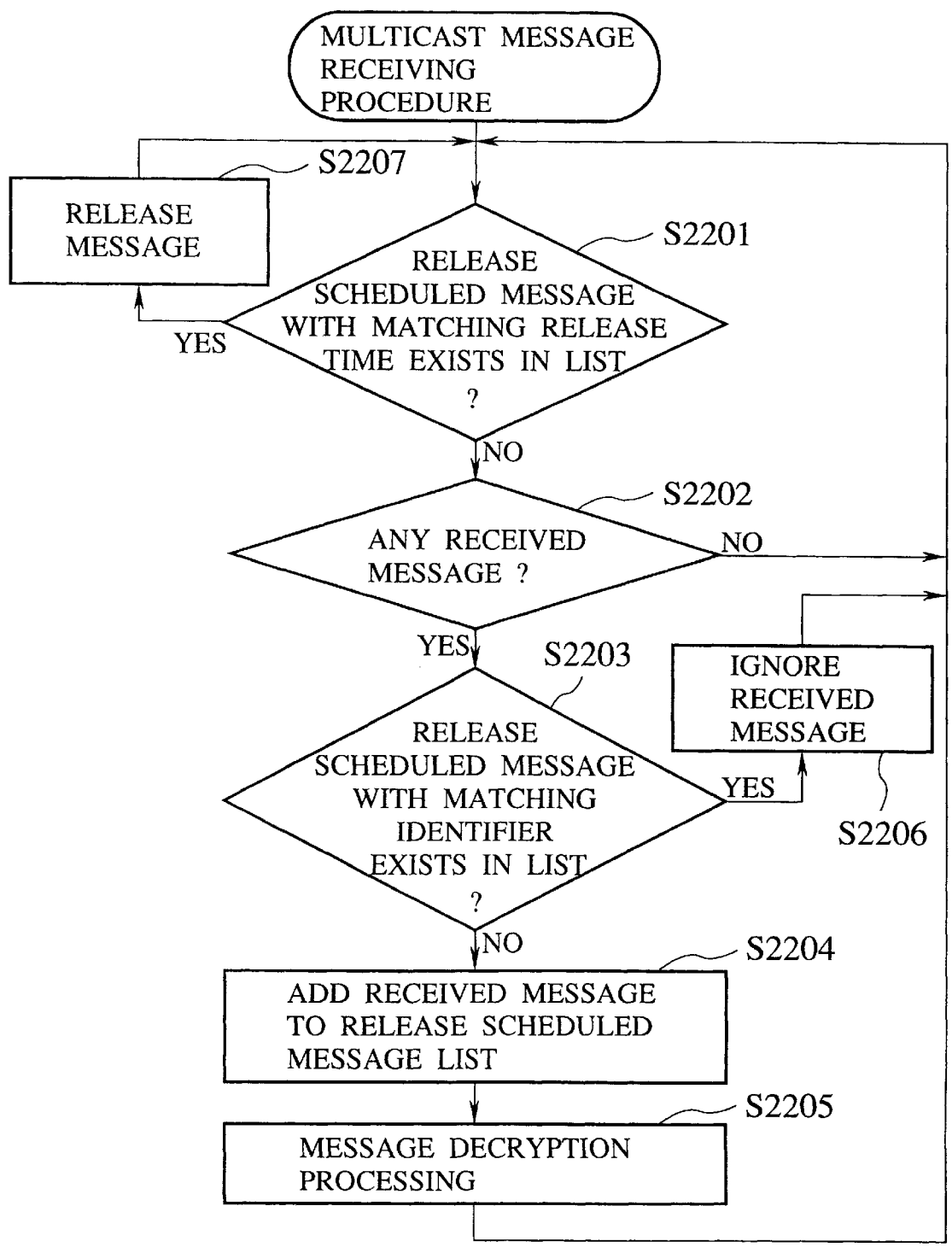
FIG. 23 is a flow chart showing a message receiving procedure by a receiving protocol device in the second embodiment of the present invention.
Figure 24:
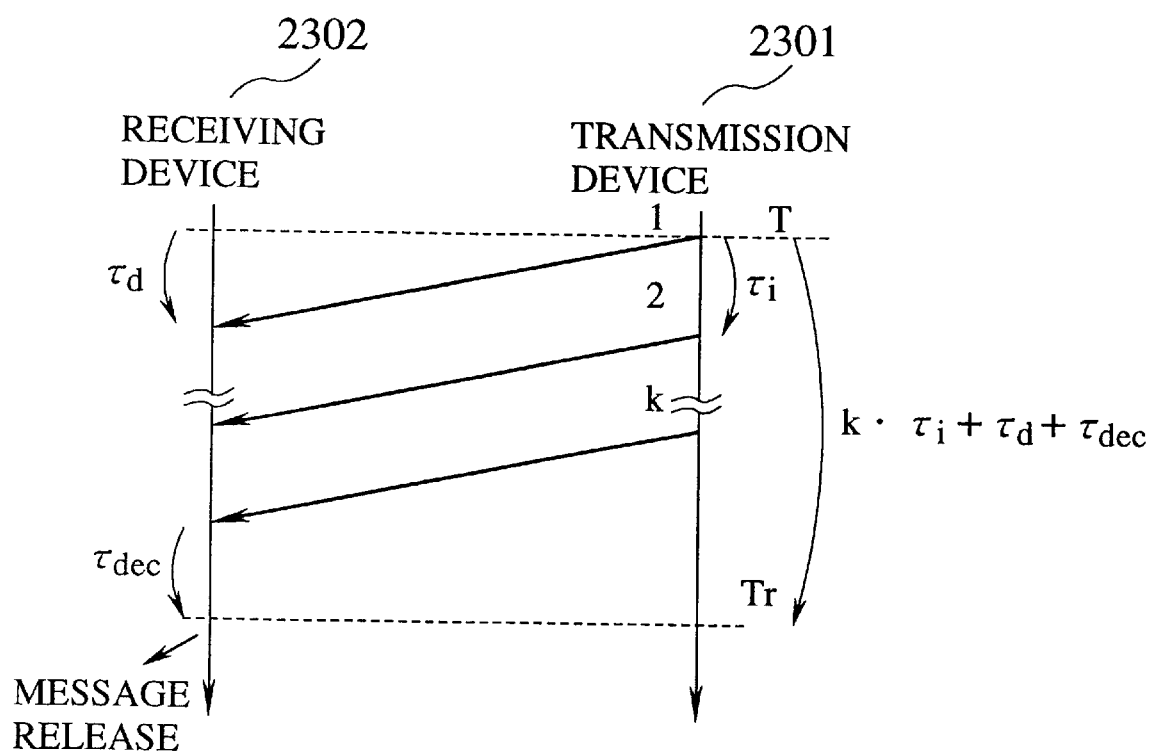
FIG. 24 is a diagram showing a message sequence in the second embodiment of the present invention.

Referring now to FIG. 22 to FIG. 24, the second embodiment of the multicast message transmission device and the message receiving protocol device according to the present invention will be described in detail.

The first embodiment described above uses a procedure in which the success of the message transfer at all the receiving protocol devices of the multicast group is acknowledged, and then the release time is distributed to the receiving protocol devices by accounting for the message order.

In contrast, this second embodiment uses a simpler time guaranteeing procedure for a case in which a message is sufficiently small so that a message content and a specified release time can be stored within a single packet. This corresponds to the "message delivery without acknowledge" scheme in a case of "without release result acknowledge" shown in FIG. 19.

The only aim of this second embodiment is to realize the identical message receiving time at the receiving protocol devices for a message transmitted from a certain multicast transmission device. The message order control based on the transmission time among a plurality of multicast transmission devices is not involved here, but the identical message order is guaranteed as the identical receiving time of the message at the receiving protocol devices is guaranteed. Note here that a manner of handling in a case of receiving more than one messages with the same release time specified from a plurality of multicast transmission devices is dependent on the processing at each receiving protocol device.

Here, the message transmitted from the multicast transmission device contains the following information.

message content
message type=message
release time
multicast message identifier
message authenticator In this second embodiment, the message is transmitted for plural times, and the release time is specified with a sufficient margin so that the message can be released at the specified release time regardless of which one of the message transmitted for plural times is correctly received at the receiving side. In this manner, the message can be released at the identical time by all the receiving protocol devices.

In the following, the same definitions of parameters as summarized in FIG. 20 will be used. Here, the parameters to be used include the maximum message lose rate $P_{loss}(\tau_d)$ of the multicast group when the delay time is set to $\tau_d$, the time-out time Ts between devices 1 and j, the packet transmission interval $\tau_i$ when the loss rate due to the burst is set to $P_{loss}$, and the release processing time $\tau_{dec}$.

When the message transmission time is T, the message release time Tr is determined as follows.

$$Tr = T + \tau_r - \tau_i \cdot k + \tau_d + \tau_{dec}$$

At the receiving side, after the message is received and the decryption procedure is carried out, the message is released at the specified release time Tr. The acknowledge response is not made.

FIG. 22 is a flow chart showing the message transmission procedure in this second embodiment. In this message transmission procedure of FIG. 22, a message is transmitted at the step S2101, and then the time $\tau_i$ is waited at the step S2102. Then, at the step S2103, whether the transmission has been repeated for k times or not is judged. When it is judged that the transmission has not been repeated for k times at S2103, then steps S2101 and S2102 are repeated, whereas when it is judged that the transmission has been repeated for k times at S2103, the message transmission is completed.

FIG. 23 is a flow chart showing the message receiving procedure in this second embodiment. In this message receiving procedure of FIG. 23, whether a release scheduled message which has the release time matching with the current time exists in a release scheduled message list or not is judged at the step S2201, and if so, this release scheduled message is released at the step S2207 and the procedure returns to the step S2201. Otherwise, whether there is any received message or not is judged at the step S2202, and if not, the procedure returns to the step S2201. When there is a received message, whether a release scheduled message which has the message identifier matching with that of the received message exists in the release scheduled message list or not is judged at the step S2203. If so, the received message is ignored at the step S2206 and the procedure returns to the step S2201. Otherwise, the received message is added to the release scheduled message list at the step S2204, the message decryption processing is carried out at the step S2205, and the procedure returns to the step S2201.

FIG. 24 shows the message sequence in this second embodiment, between a transmission device 2301 and a receiving device 2302.

Figure 25:
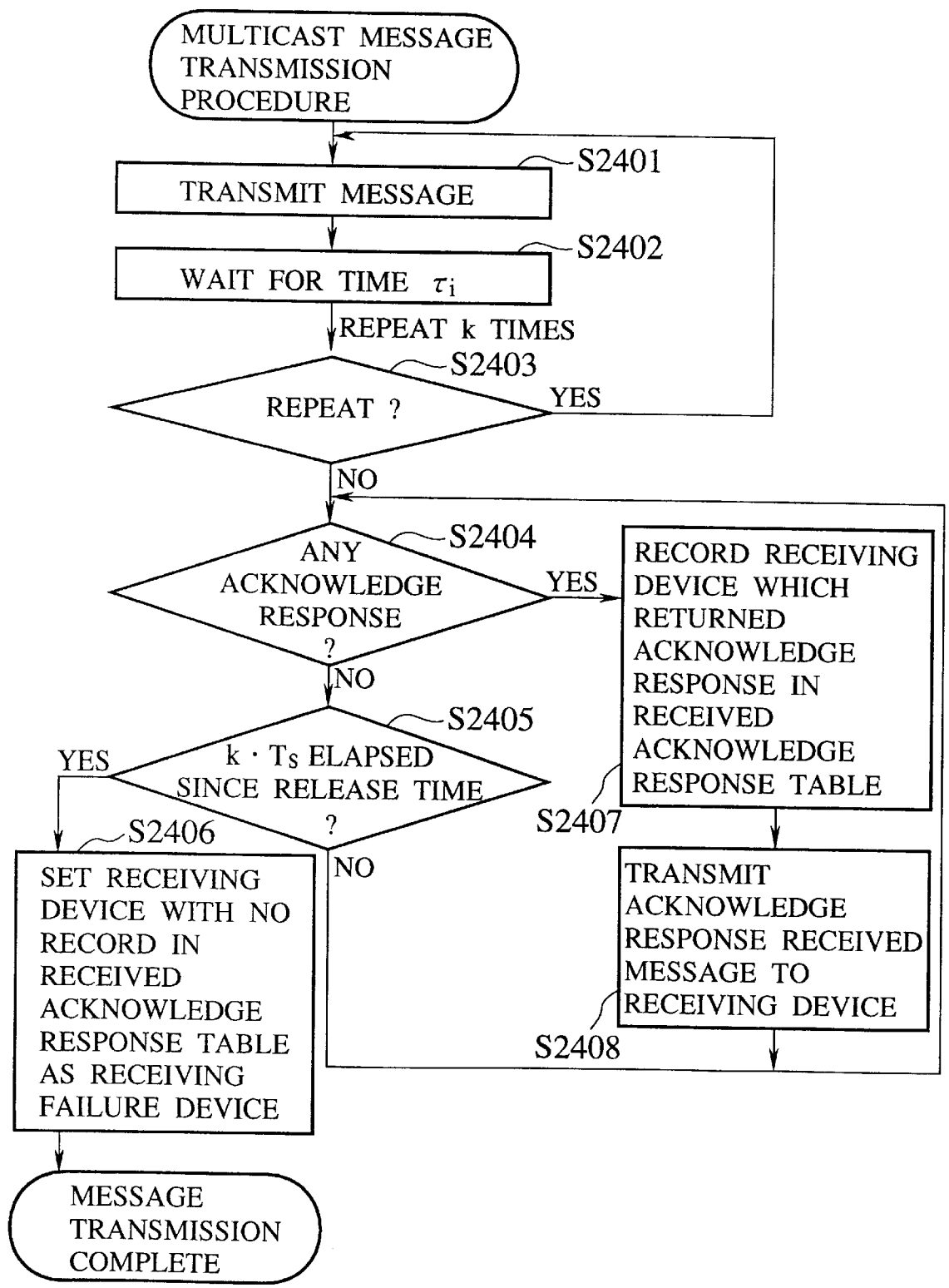
FIG. 25 is a flow chart showing a message transmission procedure by a message transmission device in the third embodiment of the present invention.
Figure 26:
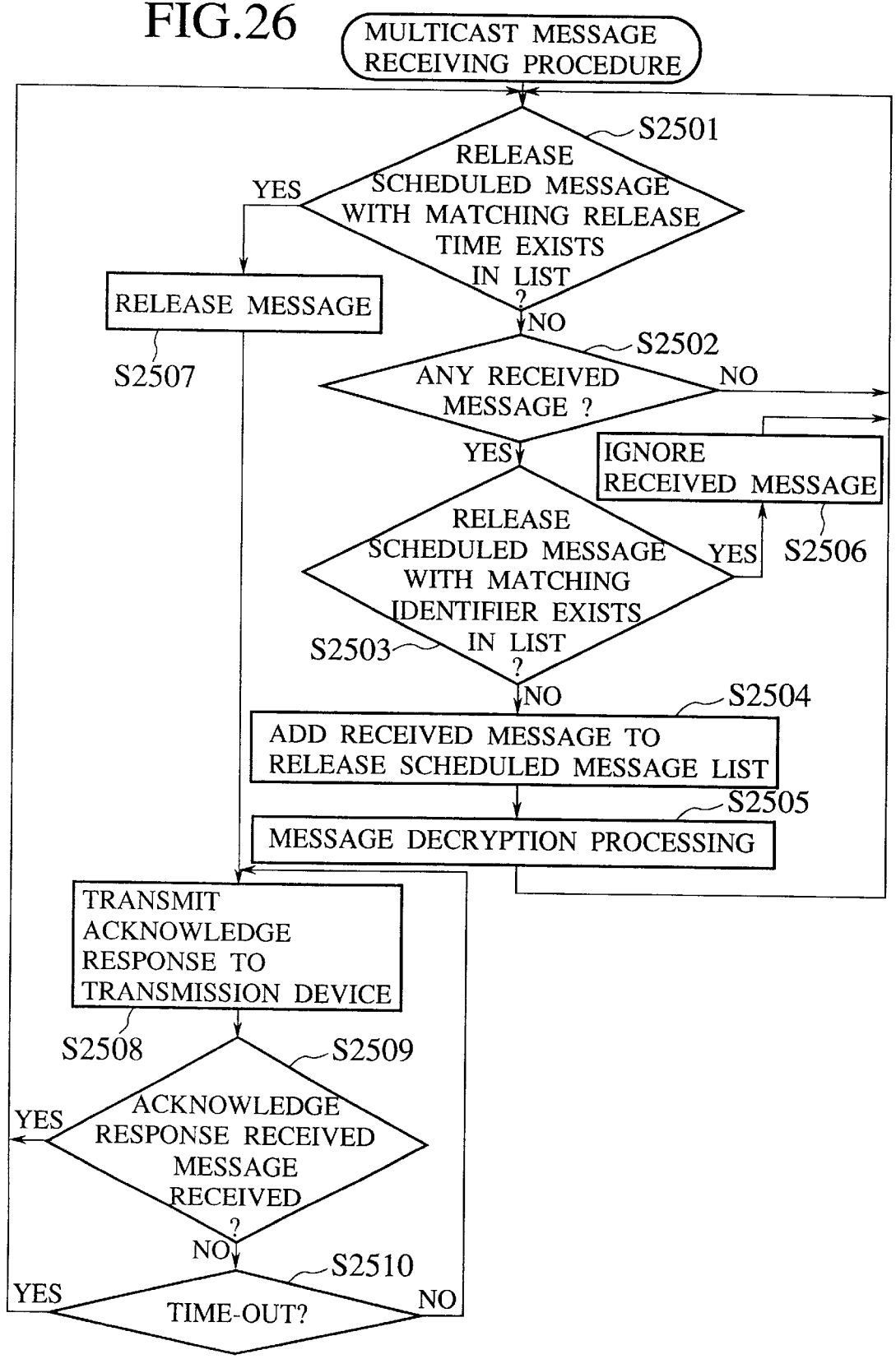
FIG. 26 is a flow chart showing a message receiving procedure by a receiving protocol device in the third embodiment of the present invention.
Figure 27:
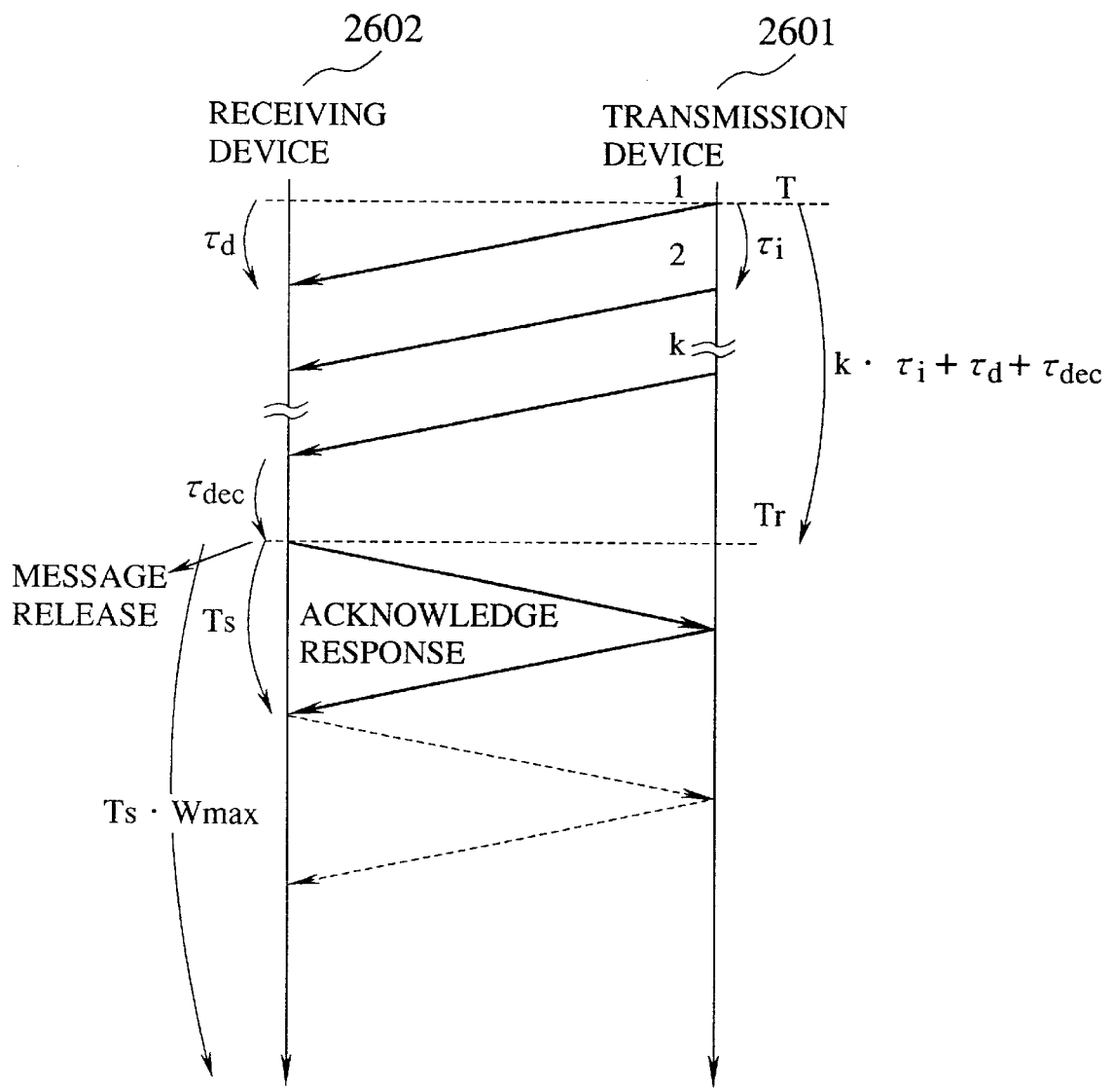
FIG. 27 is a diagram showing a message sequence in the third embodiment of the present invention.

Referring now to FIG. 25 to FIG. 27, the third embodiment of the multicast message transmission device and the message receiving protocol device according to the present invention will be described in detail.

The second embodiment described above realizes a simpler time guaranteeing procedure by transmitting a message content and a specified release time as a single message. However, in the second embodiment, it is not possible for the multicast transmission device to know whether the terminal successfully received the message or not.

In contrast, this third embodiment is directed to a case for making it possible for the multicast transmission device to know the reception result by returning the release result from the receiving protocol device to the multicast transmission device after the message releasing. This corresponds to the "message delivery without acknowledge" scheme in a case of "with release result acknowledge" shown in FIG. 19.

In this third embodiment, the receiving protocol which released the message at the specified release time transmits the acknowledge response message to the multicast transmission device.

Here, the acknowledge response message contains at least the following information.

message identifier
message type=acknowledge
receiving device identifier
message authenticator The multicast transmission device which received this acknowledge response from the receiving protocol device then records a "received" indication into an entry corresponding to that receiving protocol device in a received acknowledge response table, and transmits the acknowledge response received message to that receiving protocol device.

Here, the acknowledge response received message contains at least the following information.

message identifier
message type=acknowledge response received
message authenticator When this acknowledge response received message regarding that message is received from the multicast transmission device, the receiving protocol device completes the acknowledge response transmission operation for that message. When the acknowledge response received message is not received, the transmission of the acknowledge response to the multicast transmission device is repeated after an interval Ts, until a number of retries reaches to the maximum number of retries Wmax. This parameter Wmax can be determined similarly as in the first embodiment described above.

FIG. 25 is a flow chart showing the message transmission procedure in this third embodiment. In this message transmission procedure of FIG. 25, a message is transmitted at the step S2401, and then the time $\tau_i$ is waited at the step S2402. Then, at the step S2403, whether the transmission has been repeated for k times or not is judged. When it is judged that the transmission has not been repeated for k times at S2103, the steps S2401 and S2402 are repeated.

When it is judged that the transmission has been repeated for k times at S2403, whether there is any acknowledge response or not is judged at the step S2404. If so, the receiving protocol device which returned this acknowledge response is recorded in the received acknowledge response table at the step S2407, the acknowledge response received message is transmitted to this receiving protocol device at the step S2408, and the procedure returns to the step S2404. Otherwise, whether a time k·Ts has elapsed since the release time or not is judged at the step S2405. If not, the procedure returns to the step S2404, whereas otherwise the receiving protocol device with no record in the received acknowledge response table is set as a receiving failure device at the step S2406, and then the message transmission procedure is completed.

FIG. 26 is a flow chart showing the message receiving procedure in this third embodiment. In this message receiving procedure of FIG. 26, whether a release scheduled message which has the release time matching with the current time exists in a release scheduled message list or not is judged at the step S2501, and if so, this release scheduled message is released at the step S2507. Otherwise, whether there is any received message or not is judged at the step S2502, and if not, the procedure returns to the step S2501. When there is a received message, whether a release scheduled message which has the message identifier matching with that of the received message exists in the release scheduled message list or not is judged at the step S2503. If so, the received message is ignored at the step S2506 and the procedure returns to the step S2501. Otherwise, the received message is added to the release scheduled message list at the step S2504, the message decryption processing is carried out at the step S2505, and the procedure returns to the step S2501.

On the other hand, after the message is released at the step S2507, the acknowledge response is transmitted to the multicast transmission device at the step S2508, and whether the acknowledge response received message is received from the multicast transmission device or not is judged at the step S2509. If so, the procedure returns to the step S2501, whereas otherwise whether the time-out for the acknowledge response received message occurred or not is judged at the step S2510. If so, the procedure returns to the step S2501, whereas otherwise the procedure returns to the step S2508 so as to re-transmit the acknowledge response to the multicast transmission device. This re-transmission of the acknowledge response at the step S2508 is to be repeated for a prescribed number of times.

FIG. 27 shows the message sequence in this third embodiment, between a transmission device 2601 and a receiving device 2602.

By the first to third embodiments described above, the procedures for realizing the identical message release time in three cases out of six cases summarized in FIG. 19 have been explained. The other three cases shown in FIG. 19 can be easily obtained by modifying the first to third embodiments described above in obvious manners, so that their detailed description will be omitted here.

Referring now to FIG. 28, the fourth embodiment of the multicast message transmission device and the message receiving protocol device according to the present invention will be described in detail.

This fourth embodiment is directed to an exemplary application of the present invention to a system combining the news delivery and the automatic stock transaction.

As shown in FIG. 28, in this fourth embodiment, the system comprises: a news agency 1001; a news delivery system 1002 connected with the news agency 1001; a multicast transmission device 1003 connected with the news delivery system 1002; stock investment systems 1101-1 to 1101-n of customers for receiving news from the news agency 1001; transmission and reception devices 1102-1 to 1102-n which are connected with respective stock investment systems 1101-1 to 1101-n and which guarantee the fairness of the multicast; a multicast connection 1103 for connecting the multicast transmission device 1103 with the transmission and reception devices 1102-1 to 1102-n; stock transaction systems 1201-1 to 1201-m of stock companies; transmission and reception devices 1202-1 to 1202-m which are connected with respective stock transaction systems 1201-1 to 1201-m; multipoint-to-multipoint connections 1203-1 to 1203-m for connecting the transmission and reception devices 1102-1 to 1102-n with each of the transmission and reception devices 1202-1 to 1202-m; a stock exchange 1301; and dedicated lines for connecting each of the stock transaction systems 1201-1 to 1201-m with the stock exchange 1301.

The news agency provides a service for delivering an information which can potentially affect the stock market to the customers. The information to be delivered includes information announced by the public organization such as the employment statistics, the construction statistics, the exchange rate, etc., and news such as an onset of the international conflict.

The information is delivered fairly and impartially to the transmission and reception devices 1102-1 to 1102-n of all the customers from the multicast transmission device 1003. Consequently, the stock investment systems 1101-1 to 1101-n of all the customers receive the information simultaneously. Each stock investment system 1101 determines the investment according to the received information, and places orders to the stock companies. The orders are sent to the stock transaction systems 1201-1 to 1201-m of the stock companies through the multipoint-to-point connections 1203-1 to 1203-m. At this point, the absolute time is attached to the transmission message, and the stock company handles the earlier order with a higher priority according to the attached absolute time. The transaction is carried out through the dedicated lines 1204-1 to 1204-m connecting the stock companies with the stock exchange.

In this system, because the synchronicity and the chronological order are guaranteed, all the customers can receive the messages from the news agency without being affected by the transmission delay and the re-transmission. Also, the orders to the stock companies are handled in an order of the transmission time, so that the orders are also not affected by the transmission delay and the re-transmission. With this mechanism, it becomes possible to provide a fair commercial opportunity to a large number of customers by overcoming differences in distances and communication networks.

As described, according to the present invention, it becomes possible to receive the fair communication service even at locations associated with different transmission delays. In addition, the possibility of the illegal act by violating the protocol can be eliminated, so that it is possible to realize the fair electronic transactions.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A receiving protocol device in a multicast communication system in which multicast messages are transmitted from at least one multicast transmission device to a plurality of receiving protocol devices belonging to an identical multicast group, the receiving protocol device comprising:

a lower level interface unit for receiving each multicast message transmitted from the multicast transmission device;

a release time setting unit for setting a release time of the multicast message received by the lower level interface unit to a prescribed time specified to all of said plurality of receiving protocol devices;

a message storing unit for storing the multicast message received by the lower level interface unit until the release time set by the release time setting unit; and an upper level interface unit for releasing the message stored by the message storing unit to an upper level device provided in correspondence to said receiving protocol device, such that the multicast messages received by said plurality of receiving protocol devices are released from said plurality of receiving protocol devices to respective upper level devices simultaneously at the release time so as to realize an identical receiving time of the multicast message among users of the respective upper level devices.

2. The receiving protocol device of claim 1, further comprising:

an identifier storing unit for storing an identifier for identifying said receiving protocol device among said plurality of receiving protocol devices;

a first protection mechanism for protecting the identifier in the identifier storing unit from an illegal access; and a second protection mechanism for protecting the identifier stored in the identifier storing unit from an illegal wiretapping at a time of authenticating the identifier at the multicast transmission device.

3. The receiving protocol device of claim 1, further comprising:

a decryption unit for decrypting the multicast message by using a decryption key, the multicast message being encrypted at the multicast transmission device by using an encryption key corresponding to the decryption key, so that the message storing unit stores the multicast message as decrypted by the decryption unit.

4. A multicast transmission device in a multicast communication system in which multicast messages are transmitted from at least one multicast transmission device to a plurality of receiving protocol devices belonging to an identical multicast group, the multicast transmission device comprising:

an authentication unit for authenticating each receiving protocol device, by checking whether or not each receiving protocol device has a prescribed identifier, the prescribed identifier being a secret identifier assigned to each receiving protocol device as a proof of authenticity of a protocol implementation in each receiving protocol device;

a transmission unit for transmitting the multicast messages encrypted by using an encryption key to the receiving protocol devices; and a key distribution unit for distributing a prescribed decryption key corresponding to the encryption key to those receiving protocol devices which are authenticated by the authentication unit, prior to transmissions of the multicast messages by the transmission unit.

5. The multicast transmission device of claim 4, wherein the authentication unit includes:

an identifier storing unit for storing identifiers for identifying each of legitimate receiving protocol devices; and an identifier authentication unit for checking whether an identifier transmitted from each receiving protocol device matches with any of the identifiers stored in the identifier storing unit, and authenticating each receiving protocol device as an legitimate receiving protocol device when the identifier transmitted from each receiving protocol device matches with one of the identifiers stored in the identifier storing unit.

6. The multicast transmission device of claim 4, wherein the authentication unit checks whether an identifier transmitted from each receiving protocol device matches with any of identifiers for identifying each of legitimate receiving protocol devices managed by an external authentication server, and authenticating each receiving protocol device as an legitimate receiving protocol device when the identifier transmitted from each receiving protocol device matches with one of the identifiers managed by the external authentication server.

7. A multicast communication device in a multicast communication system in which multicast messages are transmitted from at least one multicast transmission device to a plurality of receiving protocol devices belonging to an identical multicast group, the multicast communication device comprising:

a receiving protocol device section functioning as one receiving protocol device, including:
a lower level interface unit for receiving each multicast message transmitted from the multicast transmission device;
a release time setting unit for setting a release time of the multicast message received by the lower level interface unit to a prescribed time specified to all of said plurality of receiving protocol devices;
a message storing unit for storing the multicast message received by the lower level interface unit until the release time set by the release time setting unit; and
an upper level interface unit for releasing the message stored by the message storing unit to an upper level device in correspondence to said multicast communication device, such that the multicast messages received by said plurality of receiving protocol devices are released from said plurality of receiving protocol devices to respective upper level devices simultaneously at the release time so as to realize an identical receiving time of the multicast message among users of the respective upper level devices; and a multicast transmission device section, including:
an authentication unit for authenticating each receiving protocol device;
a transmission unit for transmitting the multicast messages encrypted by using an encryption key to the receiving protocol devices; and
a key distribution unit for distributing a prescribed decryption key corresponding to the encryption key to those receiving protocol devices which are authenticated by the authentication unit, prior to transmissions of the multicast messages by the transmission unit.

8. The multicast communication device of claim 7, wherein the receiving protocol device section further includes:
an identifier storing unit for storing an identifier for identifying said multicast communication device among said plurality of receiving protocol devices;
a first protection mechanism for protecting the identifier in the identifier storing unit from an illegal access; and
a second protection mechanism for protecting the identifier stored in the identifier storing unit from an illegal wiretapping at a time of authenticating the identifier at the multicast transmission device.

9. The multicast communication device of claim 7, wherein the receiving protocol device section further includes:

a decryption unit for decrypting the multicast message by using a decryption key, the multicast message being encrypted at the multicast transmission device by using an encryption key corresponding to the decryption key, so that the message storing unit stores the multicast message as decrypted by the decryption unit.

10. The multicast communication device of claim 7, wherein the authentication unit further includes:
an identifier storing unit for storing identifiers for identifying each of legitimate receiving protocol devices; and
an identifier authentication unit for checking whether an identifier transmitted from each receiving protocol device matches with any of the identifiers stored in the identifier storing unit or not, and authenticating each receiving protocol device as an legitimate receiving protocol device when the identifier transmitted from each receiving protocol device matches with one of the identifiers stored in the identifier storing unit.

11. The multicast communication device of claim 7, wherein the authentication unit checks whether an identifier transmitted from each receiving protocol device matches with any of identifiers for identifying each of legitimate receiving protocol devices managed by an external authentication server, and authenticating each receiving protocol device as an legitimate receiving protocol device when the identifier transmitted from each receiving protocol device matches with one of the identifiers managed by the external authentication server.

12. A method for transmitting a multicast message at a multicast transmission device in a multicast communication system in which multicast messages are transmitted from at least one multicast transmission device to a plurality of receiving protocol devices belonging to an identical multicast group, the method comprising the steps of:
transmitting a multicast message to said plurality of receiving protocol devices;
determining a release time of the multicast message transmitted by the transmitting step; and
notifying the release time determined by the determining step to all of said plurality of receiving protocol devices, so that the multicast message transmitted by the transmitting step is released by all of said plurality of receiving protocol devices to respective upper level devices simultaneously at the release time as notified so as to realize an identical receiving time of the multicast message among users of the respective upper level devices.

13. The method of claim 12, wherein the notifying step notifies the release time by transmitting a release time notice indicating the release time to said plurality of receiving protocol devices, and the method further comprises the steps of:
receiving an acknowledge response for the multicast message from each receiving protocol device;
re-transmitting the multicast message to every receiving protocol device from which the acknowledge response for the multicast message was not received within a prescribed time of each message transmission or re-transmission, up to a prescribed number of times Smax;
receiving an acknowledge response for the release time notice from each receiving protocol device; and
re-transmitting the release time notice to every receiving protocol device from which the acknowledge response for the release time notice was not received within a prescribed time of each release time notice transmission or re-transmission, up to a prescribed number of times Wmax.

14. The method of claim 12, wherein the notifying step notifies the release time by repeatedly transmitting a release time notice indicating the release time to said plurality of receiving protocol devices at an interval over a prescribed time τi, for a prescribed number of times, and the method further comprises the steps of:

receiving an acknowledge response for the multicast message from each receiving protocol device;

re-transmitting the multicast message to every receiving protocol device from which the acknowledge response for the multicast message was not received within a prescribed time of each message transmission or re-transmission, up to a prescribed number of times Smax; and receiving a release result message from each receiving protocol device.

15. The method of claim 12, wherein the notifying step notifies the release time by repeatedly transmitting a release time notice indicating the release time to said plurality of receiving protocol devices at an interval over a prescribed time τi, for a prescribed number of times, and the method further comprises the steps of:

receiving an acknowledge response for the multicast message from each receiving protocol device; and re-transmitting the multicast message to every receiving protocol device from which the acknowledge response for the multicast message was not received within a prescribed time of each message transmission or re-transmission, up to a prescribed number of times Smax.

16. The method of claim 12, wherein the notifying step notifies the release time by attaching a release time indication to the multicast message transmitted by the transmitting step, and the method further comprises the steps of:

receiving an acknowledge response for the multicast message from each receiving protocol device; and re-transmitting the multicast message to every receiving protocol device from which the acknowledge response for the multicast message was not received within a prescribed time of each message transmission or re-transmission, up to a prescribed number of times Smax.

17. The method of claim 12, wherein the notifying step notifies the release time by repeatedly transmitting a release time notice indicating the release time to said plurality of receiving protocol devices at an interval over a prescribed time τi, for a prescribed number of times, and the method further comprises the step of:

receiving a release result message from each receiving protocol device.

18. The method of claim 12, wherein the notifying step notifies the release time by repeatedly transmitting a release time notice indicating the release time to said plurality of receiving protocol device at an interval over a prescribed time τi, for a prescribed number of times.

19. A method for receiving a multicast message at a receiving protocol device in a multicast communication system in which multicast messages are transmitted from at least one multicast transmission device to a plurality of receiving protocol devices belonging to an identical multicast group, the method comprising the steps of:

receiving a multicast message transmitted from the multicast transmission device;

storing a release time of the multicast message received by the receiving step as notified from the multicast transmission device, in correspondence to the multicast message received by the receiving step; and releasing the multicast message stored by the storing step at the release time stored by the storing step, to an upper level device provided in correspondence to said receiving protocol device, so that the multicast message transmitted from the multicast transmission device is released by all of said plurality of receiving protocol devices to respective upper level devices simultaneously at the release time as notified so as to realize an identical receiving time of the multicast message among users of the respective upper level devices.

20. The method of claim 19, wherein the release time is notified from the multicast transmission device in a form of a release time notice transmitted from the multicast transmission device to each receiving protocol device, and the method further comprises the steps of:

transmitting an acknowledge response for the multicast message to the multicast transmission device when the multicast message is successfully received; and transmitting an acknowledge response for the release time notice to the multicast transmission device when the release time notice is successfully received.

21. The method of claim 19, wherein the release time is notified from the multicast transmission device in a form of a release time notice transmitted from the multicast transmission device to each receiving protocol device, and the method further comprises the steps of:

transmitting an acknowledge response for the multicast message to the multicast transmission device when the multicast message is successfully received; and transmitting a release result message to the multicast transmission device when the multicast message is successfully released.

22. The method of claim 19, wherein the release time is notified from the multicast transmission device in a form of a release time notice transmitted from the multicast transmission device to each receiving protocol device, and the method further comprises the step of:

transmitting an acknowledge response for the multicast message to the multicast transmission device when the multicast message is successfully received.

23. The method of claim 19, wherein the release time is notified from the multicast transmission device in a form of a release time indication attached to the multicast message transmitted from the multicast transmission device, and the method further comprises the step of:

transmitting an acknowledge response for the multicast message to the multicast transmission device when the multicast message is successfully received.

24. The method of claim 19, wherein the release time is notified from the multicast transmission device in a form of a release time notice transmitted from the multicast transmission device to each receiving protocol device, and the method further comprises the step of:

transmitting a release result message to the multicast transmission device when the multicast message is successfully released.

25. The method of claim 19, wherein the release time is notified from the multicast transmission device in a form of a release time notice transmitted from the multicast transmission device to each receiving protocol device.

26. The multicast transmission device of claim 4, wherein the authentication unit authenticates each receiving protocol device by using a zero knowledge proof protocol.

* * * * *